(12) United States Patent
Bey et al.

(10) Patent No.: US 8,195,537 B2
(45) Date of Patent: Jun. 5, 2012

(54) METHOD AND SYSTEM FOR REPAIRING AND PROCESSING SALES TRACINGS INVOICES IN A CONTRACT MANAGEMENT SYSTEM

(75) Inventors: Omar S Bey, New York, NY (US); Erik Sieverding, Flemington, NJ (US)

(73) Assignee: iContracts, Inc., Raritan, NJ (US)

( * ) Notice: Subject to any disclaimer, the term of this patent is extended or adjusted under 35 U.S.C. 154(b) by 251 days.

(21) Appl. No.: 13/068,437

(22) Filed: Jun. 4, 2010

(65) Prior Publication Data

US 2011/0302063 A1 Dec. 8, 2011

(51) Int. Cl.
*G07B 17/00* (2006.01)
(52) U.S. Cl. .......................................... 705/30
(58) Field of Classification Search ....... 705/30
See application file for complete search history.

(56) References Cited

U.S. PATENT DOCUMENTS

2006/0190398 A1* 8/2006 Doherty et al. ................. 705/40

OTHER PUBLICATIONS

XBRL—beyond the basics: benefits for financial reporting and auditing.(electronic reporting), Bizarro, Pascal A.; Garcia, Andy CPA Journal , 80 , 5 , 62(10) May 2010.*

* cited by examiner

*Primary Examiner* — Russell S Glass

(57) ABSTRACT

A system is disclosed for processing of electronic product order data from vendors and wholesalers based on pricing contracts specifying qualifying vendors, customers, products and pricing. Product order data is compared with a plurality of pricing contracts established by product manufacturers. Errors in the product order data are identified by comparing the product order data with pricing contracts and proposed or suggested solutions to the errors are compiled. Proposed error corrections in the product order data are electronically presented to manufacturers by way of a GUI computer interface so that acceptance of proposed solutions requires minimal analysis and feedback from the manufacturers. Where proposed error solutions are deemed erroneous, manufacturers are provided a GUI interface mechanism for manual keyboard entry of appropriate corrected data. Sales invoice data is reconciled, once errors are corrected, for automatic posting and payment of rebates to vendors or wholesalers based on pricing terms established in the contracts.

4 Claims, 18 Drawing Sheets

Current Open Items

This Process will allow you to view and manually repair invalid Chargeback Data. Please select each link from left to right starting with the Invalid Contract link.

Invalid Contract | Inactive Contract | Invalid Product | Missing Invoice Date | Invalid Quantity | Incorrect Contract Price | Incorrect WAC Price | Invalid Claim

157

1 to 50 of 96   <  1 2  >   View All   Page Size: 50   Export To Excel

| Detail | Message | Debit Memo Id | Override | Reject | Contract Id | Vendor Id | Vendor Name | Invoice Date | Product Id | |
|---|---|---|---|---|---|---|---|---|---|---|
| Details | | 1230081596 | ☐ | ☐ | PHS1 | 234132 | MORRIS & DICKSON CO., LTD.-LA. | 12/29/2008 | 54321-0009-41 | TRI |
| Details | | 1226081596 | ☐ | ☐ | PHS1 | 234132 | MORRIS & DICKSON CO., LTD.-LA. | 12/24/2008 | 54321-0008-41 | TRI |
| Details | | 1226081596 | ☐ | ☐ | PHS1 | 234132 | MORRIS & DICKSON CO., LTD.-LA. | 12/26/2008 | 54321-0009-41 | TRI |
| Details | | 1225081596 | ☐ | ☐ | PHS1 | 234132 | MORRIS & DICKSON CO., LTD.-LA. | 12/24/2008 | 54321-0008-41 | TRI |
| Details | | 1225081596 | ☐ | ☐ | PHS1 | 234132 | MORRIS & DICKSON CO., LTD.-LA. | 12/24/2008 | 54321-0009-41 | TRI |
| Details | | 1223081596 | ☐ | ☐ | PHS1 | 234132 | MORRIS & DICKSON CO., LTD.-LA. | 12/21/2008 | 54321-0009-41 | TRI |
| Details | | 1223081596 | ☐ | ☐ | PHS1 | 234132 | MORRIS & DICKSON CO., LTD.-LA. | 12/22/2008 | 54321-0009-41 | TRI |
| Details | | 1223081596 | ☐ | ☐ | PHS1 | 234132 | MORRIS & DICKSON CO., LTD.-LA. | 12/23/2008 | 54321-0008-41 | TRI |
| Details | | 1223081596 | ☐ | ☐ | PHS1 | 234132 | MORRIS & DICKSON CO., LTD.-LA. | 12/23/2008 | 54321-0009-41 | TRI |
| Details | | 1223081596 | ☐ | ☐ | PHS1 | 234132 | MORRIS & DICKSON CO., LTD.-LA. | 12/23/2008 | 54321-0009-46 | TRI |
| Details | | 1219081596 | ☐ | ☐ | PHS1 | 234132 | MORRIS & DICKSON CO., LTD.-LA. | 12/19/2008 | 54321-0009-41 | TRI |
| Details | | 1218081596 | ☐ | ☐ | PHS1 | 234132 | MORRIS & DICKSON CO., LTD.-LA. | 12/18/2008 | 54321-0008-41 | TRI |
| Details | | 1218081596 | ☐ | ☐ | PHS1 | 234132 | MORRIS & DICKSON CO., LTD.-LA. | 12/18/2008 | 54321-0009-41 | TRI |
| Details | | 1218081596 | ☐ | ☐ | PHS1 | 234132 | MORRIS & DICKSON CO., LTD.-LA. | 12/18/2008 | 54321-0009-46 | TRI |
| Details | | 1218081596 | ☐ | ☐ | PHS1 | 234132 | MORRIS & DICKSON CO., LTD.-LA. | 12/18/2008 | 54321-0009-46 | TRI |
| Details | | 1217081596 | ☐ | ☐ | PHS1 | 234132 | MORRIS & DICKSON CO., LTD.-LA. | 12/17/2008 | 54321-0008-46 | TRI |
| Details | | 1217081596 | ☐ | ☐ | PHS1 | 234132 | MORRIS & DICKSON CO., LTD.-LA. | 12/17/2008 | 54321-0008-46 | TRI |
| Details | | 1217081596 | ☐ | ☐ | PHS1 | 234132 | MORRIS & DICKSON CO., LTD.-LA. | 12/17/2008 | 54321-0009-41 | TRI |
| Details | | 1217081596 | ☐ | ☐ | PHS1 | 234132 | MORRIS & DICKSON CO., LTD.-LA. | 12/17/2008 | 54321-0009-41 | TRI |
| Details | | 1216081596 | ☐ | ☐ | PHS1 | 234132 | MORRIS & DICKSON CO., LTD.-LA. | 12/14/2008 | 54321-0008-41 | TRI |
| Details | | 1216081596 | ☐ | ☐ | PHS1 | 234132 | MORRIS & DICKSON CO., LTD.-LA. | 12/15/2008 | 54321-0008-46 | TRI |
| Details | | 1216081596 | ☐ | ☐ | PHS1 | 234132 | MORRIS & DICKSON CO., LTD.-LA. | 12/15/2008 | 54321-0009-41 | TRI |
| Details | | 1216081596 | ☐ | ☐ | PHS1 | 234132 | MORRIS & DICKSON CO., LTD.-LA. | 12/16/2008 | 54321-0008-41 | TRI |

Current Open Items

This Process will allow you to view and manually repair invalid Chargeback Data. Please select each link from left to right starting with the Invalid Contract link.

Invalid Contract | Inactive Contract | Invalid Product | Missing Invoice Date | Invalid Quantity | Incorrect Contract Price | Incorrect WAC Price | Invalid Claim

— 157

1 to 50 of 525   <  [1] 2 3 4 5 6 7 8 9 10 >   View All   Page Size: 50   Export To Excel

| Detail | Message | Debit Memo Id | Override | Reject | Contract Id | Owner | End Customer Id | End Customer Name | Inv Da |
|---|---|---|---|---|---|---|---|---|---|
| Details | | CB35728 | ☐ | ☐ | MCKESSON NET | MCKESSON NETWORK NET | AG5504990 | LAKOTA DRUG AND GIFT | 2/16, |
| Details | | CB35257 | ☐ | ☐ | MCKESSON NET | MCKESSON NETWORK NET | AH3241318 | HERITAGE PHARMACY | 2/9/2 |
| Details | | CB35257 | ☐ | ☐ | MCKESSON NET | MCKESSON NETWORK NET | BB5111492 | B AND B NORTHWEST | 2/9/2 |
| Details | | CB35257 | ☐ | ☐ | MCKESSON NET | MCKESSON NETWORK NET | BB5111492 | B AND B NORTHWEST | 2/10, |
| Details | | CB35257 | ☐ | ☐ | MCKESSON NET | MCKESSON NETWORK NET | BG0317467 | GLEN ULLIN DRUG | 2/9/2 |
| Details | | CB35257 | ☐ | ☐ | MCKESSON NET | MCKESSON NETWORK NET | BK7313909 | KEYCARE PHARMACY | 2/11, |
| Details | | 9054YMVAWL | ☐ | ☐ | MCKESSON NET | MCKESSON NETWORK NET | AK1605887 | HARVARD AVE DRUG | 2/14, |
| Details | | 9054YMVAWL | ☐ | ☐ | MCKESSON NET | MCKESSON NETWORK NET | BP8047462 | PARSON'S CANBY PHCY | 2/13, |
| Details | | 9054YMVAWL | ☐ | ☐ | MCKESSON NET | MCKESSON NETWORK NET | BR6183088 | RED CROSS PHARMACY | 2/14, |
| Details | | 9054YMVAWC | ☐ | ☐ | MCKESSON NET | MCKESSON NETWORK NET | AT9037385 | VILLAGE APOTHECARY | 2/16, |
| Details | | 9054YMVAWC | ☐ | ☐ | MCKESSON NET | MCKESSON NETWORK NET | BF4448456 | FOSTERS PHARM | 2/16, |
| Details | | 9054YMVAWC | ☐ | ☐ | MCKESSON NET | MCKESSON NETWORK NET | BW9560221 | WHITACRE DRUG #3 | 2/16, |
| Details | | 9054YMVAWC | ☐ | ☐ | RITEAID2 | RITE AID CORPORATION | AG2062608 | RITE AID-03134 | 2/19, |
| Details | | 9054YMVAWC | ☐ | ☐ | RITEAID2 | RITE AID CORPORATION | BN5752604 | RITE AID-01405 | 2/18, |
| Details | | 9054YMVAWC | ☐ | ☐ | RITEAID2 | RITE AID CORPORATION | BN5752604 | RITE AID-01405 | 2/18, |
| Details | | 9054YMVAWC | ☐ | ☐ | RITEAID2 | RITE AID CORPORATION | BN5752604 | RITE AID-01405 | 2/18, |
| Details | | 9054YMVAWC | ☐ | ☐ | RITEAID2 | RITE AID CORPORATION | BT1790686 | RITE AID-02394 | 2/15, |
| Details | | 9054YMVATA | ☐ | ☐ | MCKESSON NET | MCKESSON NETWORK NET | B96610162 | 41 ST PHARMACY DISCOUNT | 2/13, |

METHOD AND SYSTEM FOR REPAIRING AND PROCESSING SALES TRACINGS INVOICES IN A CONTRACT MANAGEMENT SYSTEM

FIELD OF THE INVENTION

The present invention relates in general to automated computer order acceptance and tracking systems and more particularly to a system with automated data repair features.

BACKGROUND OF THE INVENTION

Automated electronic contract management information processing systems that are computer based have been in use since the 1980s. These systems have been somewhat successful in reducing many of the manual steps involved in processing invoice orders and tracking product order data. Product manufacturers use such systems to process product order data referred to as "sales tracings data" on invoices (product order statements associated with the purchased product) in order to verify, repair and/or pay a claim for payment due wholesalers or distributors under such contracts. Particularly in the pharmaceutical industry, market forces and competition have prompted manufacturers to vary product pricing via regularly changing pricing contracts that provide special product pricing to vendors for fixed periods of time. Typically, a manufacturer establishes a contractual arrangement with vendors (wholesalers or distributors) who electronically order product at predetermined pricing. Vendors may qualify to receive a rebate on product sold under certain circumstances or conditions, e.g. volume discounts or due to market pricing changes that have taken place since the vendor last ordered product that is currently maintained in the vendor's inventory. In order to receive the rebates the vendors must submit "sales tracings data" to the manufacturers as proof of sales of the product, by the vendor, to an eligible customer within the contract time window. The sales tracings data provides confirmation that purchase orders or invoices have been or will be presented to the manufacturer. Upon processing the sales tracings data, the manufacturer will then process the invoice level data with the objective of sending a rebate payment to the vendor responsible for the invoice or crediting that vendors account in the amount of the rebate. The manufacturer will then issue a rebate to the vendor that sourced the invoice by creating a corresponding accounts receivable/payable entry in its accounting system reflecting a rebate amount attributable to that particular invoice that will be paid or credited to the vendor. Computer programs track each payment entry at the "invoice line item" detail level so that a full audit trail can be recreated, on demand, regarding a particular vendor and its associated invoiced product sales quantities, purchaser, and dates for each invoiced sales transaction.

These systems have been somewhat successful in reducing many of the manual steps involved in managing order data and associated accounting information. However, none of them have been able to address the cumbersome process of repairing invalid data in sales tracings on invoices. The present manner in which sales tracings are repaired involves editing electronic invoice line entries one at a time. The manual sales tracings repair process takes up to 80% of a contract administrator's time spent processing (collecting, verifying, repairing and reconciling) sales tracings. All of the presently available electronic contract management systems on the market today require that the contract administrator review invalid sales tracings invoices using this "one line at a time" correction method. When performing the "one line at a time" correction method the contract administrator is reviewing each error detected by the contract management system. Each error has to be researched by the contract administrator prior to correction thereof. Such research requires the contract administrator lookup contract information in order to determine the proper solution/data to repair the incorrect data identified in the sales tracings data.

Below is a list of the more common errors that a contract administrator is required to address and correct:

Contract Number/ID: Is the contract number/ID missing or incorrect?
Contract Date: Has the contract expired or is it not yet in force?
Invoice Number: Is the invoice number missing or incorrect?
Invoice Date: Is the invoice date missing or invalid?
Customer's Eligibility on the Contract: Is the customer covered under the contract, expired or not yet eligible?
Customer's ID number: Is the customer's ID number missing or invalid?
Drug's Eligibility: Is the drug covered, expired, or not yet eligible under the contract
Drug Identifier/NDC: Is the drug identifier missing or incorrect?
Wholesaler's Eligibility: Is the wholesaler covered, expired, or not yet eligible under the contract?
Drug Quantity: Is the quantity invalid or missing?
Contract Price: Is the contract price missing or incorrect?
WAC (wholesale acquisition cost) Price: Is the WAC price missing or incorrect?
Credit Claimed: Is the credit claimed correct?
Chargeback Duplicate: Has the chargeback (rebate) request been previously submitted?

An automated computer system, or method, that is designed to automatically determine and recommend potential corrections to such errors as described above, as well as addressing other errors, and that reduces or minimizes the burden borne by the contract administrator to research and correct such erroneous data is thus needed.

SUMMARY OF THE INVENTION

A method for processing and correcting errors in electronically transmitted purchasing invoice data, according to one aspect of the present invention, comprises the steps of providing a data information server system, the server system being computer based and having a processor, dynamic memory, a mass storage device for storing data and a networking device, connecting the networking device to a wide area network to enable electronic communications with purchasers having purchaser computers connected to the wide area network and manufacturers having manufacturer computers connected to the wide area network, receiving electronic invoices from purchaser computers over the wide area network, the electronic invoices containing sales tracings records, and storing the sales tracings records in the mass storage device, the sales tracings records including a vendor identifier, a purchaser identifier, a manufacturer identifier, a product description, a product price and a product quantity for a wide variety of products produced by various manufacturers, analyzing the sales tracings records for errors and assigning error codes to each of the sales tracings records having errors in the data contained in the sales tracings record and storing the error code with the sales tracings record in the mass storage device, creating a first electronic error report for a particular manufacturer in response to an electronic request from the particular manufacturer, the first electronic error report including a list of all sales tracings records having errors therein and a manufacturer ID corresponding to the particular manufacturer, and grouping together sales tracings records having identical errors codes and determining a proposed solution for each error code, transmitting a first interactive GUI display screen to the particular manufacturer computer to display the first electronic error report corresponding to the manufacturers identifier, the first interactive GUI display screen including a plurality of first GUI input objects, one corresponding to each sales tracing record included in the first electronic error report, the plurality of first GUI input objects each being initially deactivated and user changeable to an activated state to indicate rejection of the proposed solution to correct the error code in each of the sales tracings records displayed, and receiving from the particular manufacturer's computer a first error correction command containing the state of each of the plurality of first GUI input objects, the first error correction command causing the server system to modify corresponding ones of the sales tracings records in accordance with the corresponding deactivated state of the plurality of first GUI input objects and the proposed solution for the corresponding sales tracings record.

One object of the present invention is to provide an improved contract order management system having automated product order verification tracking and monitoring capabilities.

Another object of the present invention is to analyze invoice order data and determine possible solutions to erroneous data in an automated fashion and present the proposed solutions to a user responsible for approval thereof.

Yet another object of the present invention is to reduce the human user burden in identifying unrepairable data and return that data to the source, typically a wholesaler or vendor.

These and other objects of the present invention will become more apparent from the following description of the preferred embodiment and the accompanying figures.

BRIEF DESCRIPTION OF THE DRAWINGS

FIG. 9 is a screen capture of the browser window for repair of invalid contract ID data where system 16 is unable to identify a proposed solution.

FIG. 10 is a screen capture of the browser window for repair of customer not eligible errors.

FIG. 11 is a screen capture of the browser window for repair of customer not covered errors.

Figure 12:
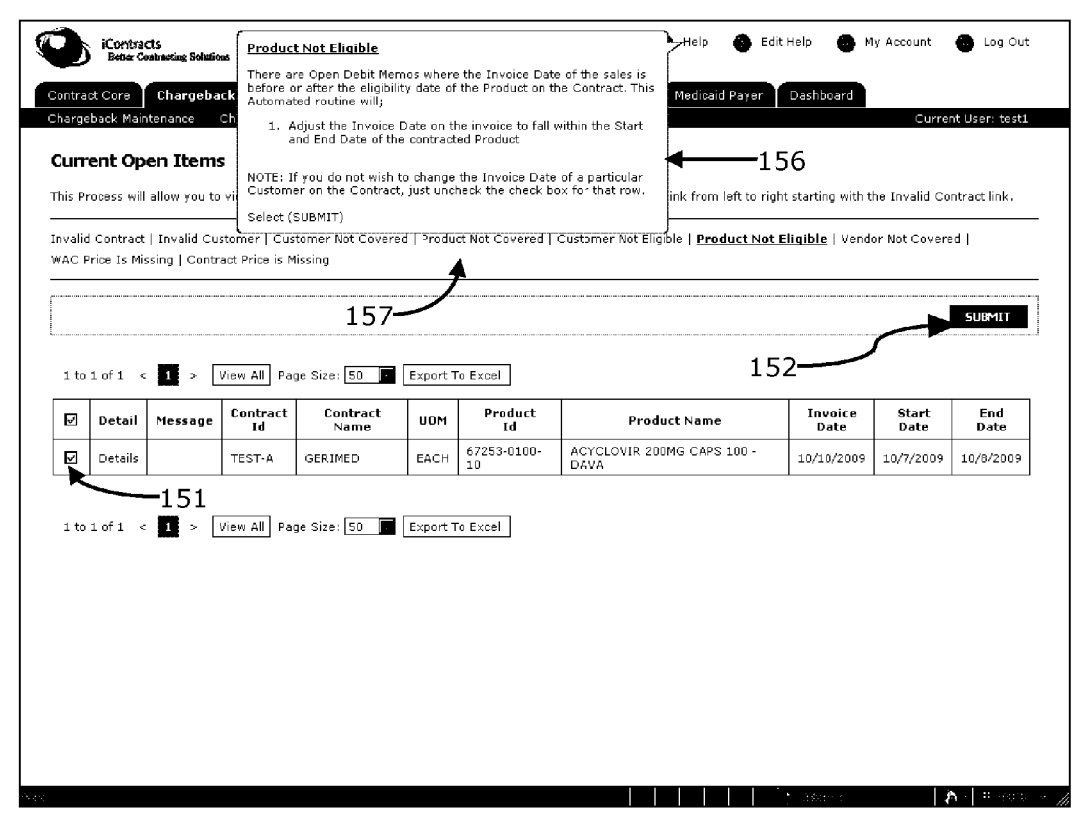

FIG. 12 is a screen capture of the browser window for repair of product not eligible errors.

Figure 13:
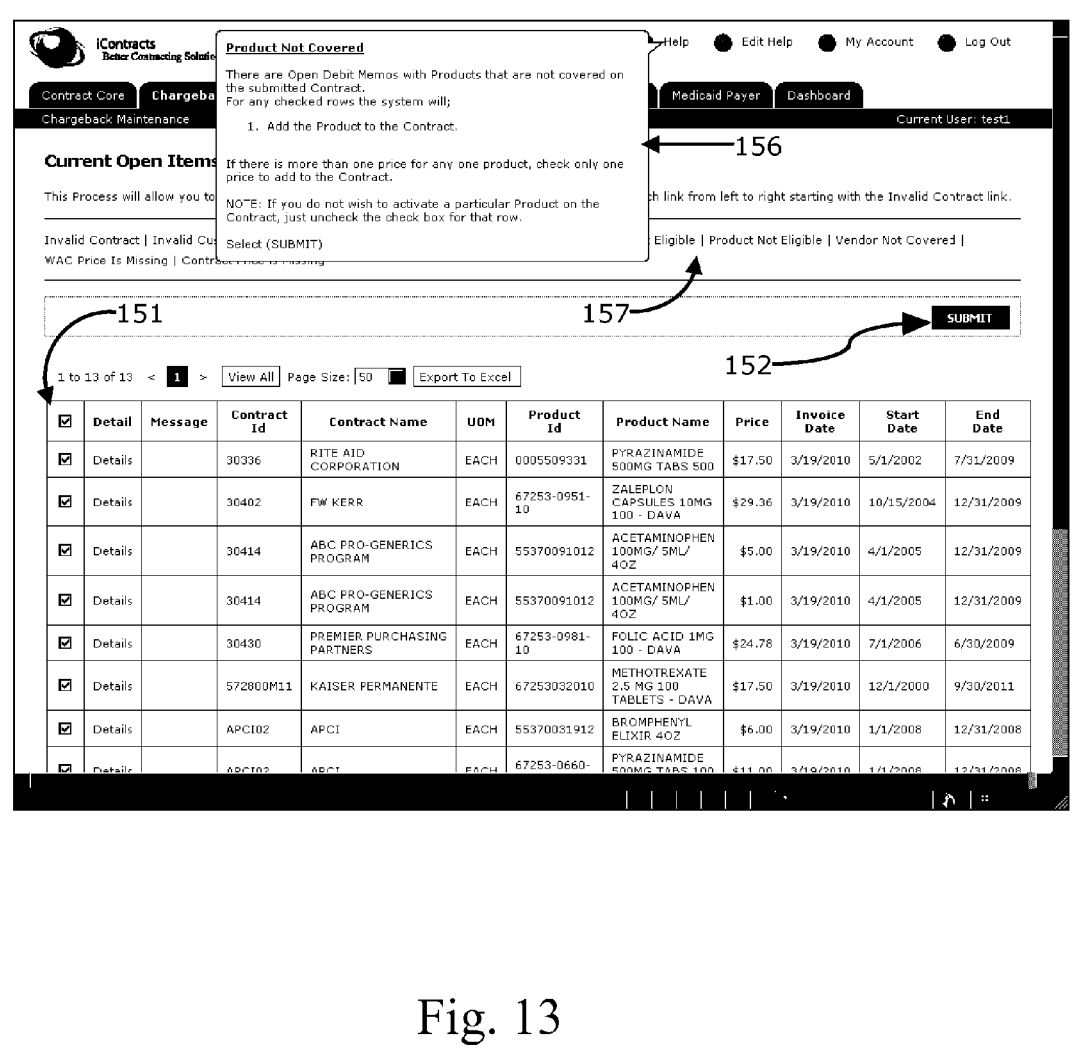

FIG. 13 is a screen capture of the browser window for repair of product not covered errors.

FIG. 15 is the left half of a screen capture of the browser window for repair of incorrect WAC price errors.

FIG. 17 is the left half of a screen capture of the browser window for repair of incorrect contract price errors.

DESCRIPTION OF THE PREFERRED EMBODIMENT

Figure 1:
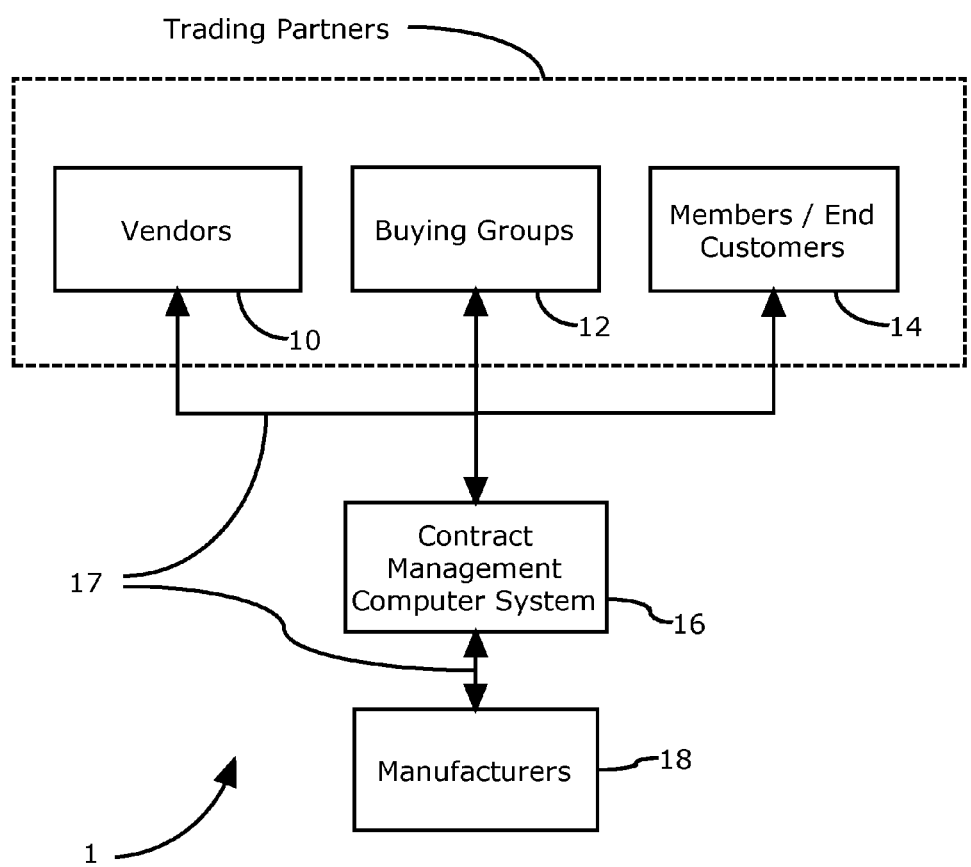
FIG. 1 is a block diagram depicting the components of the contract management system of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a block diagram or diagrammatic illustration is shown depicting the components of a method and system for displaying and processing sales tracings invoices in a contract management system 1 according to the present invention. Vendors 10 exchange electronic data with contract management system 16. Vendors 10, buying groups 12 and members or end customers 14 are collectively referred to herein as "trading partners". Buying groups 12 and members/end customers 14 order product from vendors electronically via communications network 17. Electronic order data from vendors 10 is electronically transmitted to contract management system 16 via communications network 17. The electronic order data received by system 16 is typically electronic invoices or orders consisting of sales tracings data from which product orders are placed and rebates are calculated in accordance with pricing contracts established by manufacturers 18. Product price rebates are based on the difference between a WAC (wholesale acquisition cost) price to the vendor versus a price established in accordance with the pricing contract. Product manufacturers 18 are also connected via network 17 to contract management computer system 16 for receiving invoice order data and for exchange of other data with the contract management computer system 16. Network connections 17 are typically networking connections using 10base-T Ethernet over standard CAT5 twisted pair cabling connections or any other well known networking topology suitable for such applications. A preferred approach is to use computers incorporating networking connections routed through a wide area network gateway to access the Internet using TCP/IP communications protocol widely used for Internet connectivity with personal computers since the early 1990's. Preferably, network 17 is the Internet, though any other alternative inter-computer networking scheme is contemplated.

Contract management computer system 16 consists of a CPU, mass data storage devices such as magnetic media high speed hard disks, RAM, ROM and 10baseT networking interfaces to connect with network 17. The exchange of data with vendors 10 and manufacturers 18 may be accomplished using customized programs running on the computers of the trading partners 10 or manufacturers 18, or more effectively in the modern Internet era, by use of web browser technology well known in the computing industry. Web browser components such as Javascript, Java, and Activex technologies enable sophisticated interaction with users of remote computers over the Internet via web browser programs such as Internet Explorer, Mozilla Firefox, Opera, Safari, Google's Chrome and other well known web browser programs used in the personal computing industry.

System 16 includes database management software for storing and retrieval of data from a database, specifically sales tracing data received from vendors 10. System 16 also includes web server program capability to provide a web server based interactive user interface accessed by manufacturers 18. It is also contemplated that email and/or instant messaging communications may take place over network 17 between trading partners and manufacturers for exchange of information.

Typical operation of the contract management system 1 consists of receiving electronic order invoices or sales tracings data from vendors 10 via network 17 and storing that data in a database on system 16. An individual sales tracings data record normally contains a single line item entry from an order invoice. Next, the sales tracings data records are parsed and analyzed for errors or omissions. Error codes are assigned to individual sales tracings data records in the database when erroneous data is detected. Possible erroneous data is detected in sales tracings data by comparing sales tracings data with predetermined contract data, established by manufacturers 18, and with other sales tracings data records stored in the database. Predetermined contract data is established by pricing contracts provided by manufacturers and includes, but is not limited to, data such as contract ID, vendor ID, customer ID, eligible customers, product ID, WAC product price, contract product price and contract term (a date range within which the contract pricing is valid). Contract data is stored in a database on system 16.

Computer system 16 provides an interactive mechanism for manufacturers 18 to review sales tracings data records with errors and correct such errors. Error correction is accomplished by way of web based interactive computer communications between system 16 and computer users, or contract administrators, employed by manufacturers 18. System 16 determines proposed corrections or solutions to errors detected in the sales tracings records from vendors 10. Manufacturers 18 are presented with web based displays of the proposed solutions to data errors, which are implemented via visual review and simplistic acceptance of the proposed error corrections via web browser interaction with system 16. Manufacturers 18 are also provided with manual error correction data entry mechanisms to provide data to system 16 for correction of errors where the proposed corrections suggested by system 16 are deemed incorrect by contract administrators. The final step in the process includes receiving corrected sales tracings records data and transmitting finalized, or reconciled, sales tracings record data in various formats to manufacturers 18 after the sales tracings data has been verified to be correct. Computer system 16 receives data from manufacturers 18 containing corrections for sales tracings records with errors and updates its database accordingly. Finally, the sales tracings are reconciled and processed by system 16 to create reports provided to manufacturers 18 consisting of verified sales tracings data. Manufacturers 18, having now received verifiable data regarding sales by vendors 10, process the sales tracings data and issue rebate checks or credits to vendor accounts based on the difference between WAC product pricing and contract product pricing for products sold by vendors 10 under the established contracts. Unrepairable or uncorrectable sales tracings records are returned, by system 16, to vendors 10 for editing and resubmission by vendors 10.

The basic process of collecting, verifying, repairing and reconciling contractual sales tracings begins with a manufacturer contract or agreement established by manufacturers 18 and covering trading partners 10, 12, and 14. Such contracts enable vendors 10 to sell product to buying groups 12 and members/end customers 14 at a predetermined price in accordance with the terms of the contract. In accordance with specified product contract pricing, vendors 10 receive a cash rebate based on sales of products covered by the contract. The terms of the rebate are determined by various conditions established in the contract, primarily the difference between the WAC price the vendor paid for existing inventory of a particular product and the current contract price for that product. However, to receive rebate payments, vendors 10 must submit sales tracings data, via system 16, as proof of purchase invoices to manufacturers 18. Once manufacturers 18 receive a proof of purchase (in the form of electronically delivered sales tracings data from system 16), manufacturers 18 use automated systems to parse and process the sales tracings data reports from system 16 and determine rebate payments for eligible vendors 10. Once a rebate payment is calculated and verified by system 16 an accounts receivable/payable entry is created in the manufacturer's accounting records via electronic data sent from system 16 to manufacturer 18. This payment entry represents a rebate for vendors 10 that is traceable, at the invoice line item detail level, so that a full audit trail is available to track product orders for all trading partners 10, 12, and 14 and for payment of rebates to vendors 10.

A detailed operational flow of software executing on system 16 is described below and in the flowcharts shown in FIGS. 2-6. Example user GUI (graphical user interface) web browser screen images are also shown, in the figures and discussed below, which depict the graphical user interface mechanisms employed by system 16 to interact with manufacturers 18 to transmit, receive and confirm sales tracings data.

Figure 2:
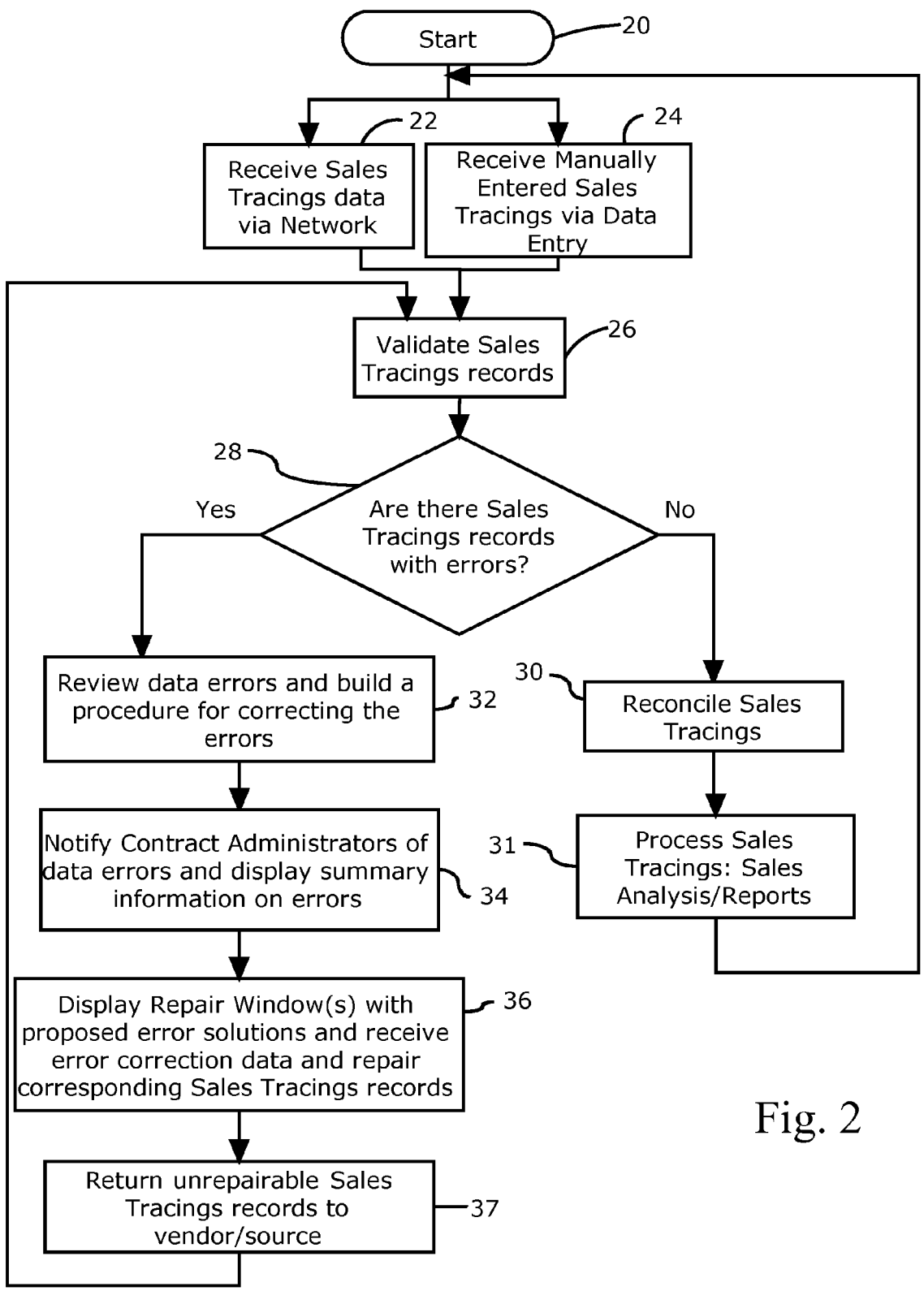
FIG. 2 is a flowchart detailing the sequence of operations performed by the contract management system 16 of FIG. 1.

Referring now to FIG. 2, a flowchart of the steps performed by computer system 16 is shown. It should be readily recognized that the program flowcharted in FIG. 2 is executed at regular timed intervals, as often as multiple times during a business day, to collect and process product order data and forward results to manufacturers 18. Program execution begins at step 20. Next at steps 22 and 24, sales tracings data is received from vendors 10 and stored in a sales tracings database file on system 16 (FIG. 1). Sales tracings data may be received by system 16 in response to a request from system 16 to vendors 10 to send such data, or alternatively, vendors 10 may send such data as it is created and system 16 stores the sales tracings data in its database for later processing. Sales tracings data received from vendors 10 includes many predetermined data fields, including but not limited to User ID, Invoice Number, Contract ID, Product ID, Product Quantity, WAC Product Price, Contract Price, Customer ID and potentially any other data related to products sold by manufacturers 18. Each individual line item or order entry from an invoice is stored as a sales tracings record in the sales tracings database file maintained by system 16. Unprocessed sales tracings records are marked with a flag as "open" and verified records are marked as "closed". Such database files are typically stored on a mass storage device such as a computer hard drive.

At step 22, new sales tracings data is received by system 16 via network 17 (FIG. 1) from vendors 10 (FIG. 1). A mechanism is also provided for manual entry of printed hard copy invoice data at step 24, wherein product order data is manually entered into the sales tracings database file by human operators. Sales tracings records are next validated at step 26. The validation process of step 26 involves parsing the "open" flagged sales tracings records in the sales tracings database and detecting errors and attaching appropriate error codes to individual sales tracings records. Examples of issues/errors addressed in the validation process include:

1) Contract Number/ID: Is the contract number/ID missing or incorrect?
2) Contract Date: Has the contract expired or is it not yet in force?
3) Invoice Number: Is the invoice number missing or incorrect?
4) Invoice Date: Is the invoice date missing or invalid?
5) Customer's Eligibility on the Contract: Is the customer covered, expired or not yet eligible?
6) Customer's ID number: Is the customer's ID number missing or invalid?
7) Product's Eligibility: Is the product covered, expired, or not yet eligible
8) Product Identifier/NDC: Is the product identifier missing or incorrect?
9) Vendor's Eligibility: Is the vendor covered, expired, or not yet eligible?
10) Product Quantity: Is the quantity invalid or missing?
11) Contract Price: Is the contract price missing or incorrect?
12) WAC Price: Is the WAC price missing or incorrect
13) Credit Claimed: Is the credit/rebate claimed correct?
14) Chargeback Duplicate: Has the chargeback request been previously submitted?

Each sales tracing record that contains incorrect or erroneous data is flagged or marked to indicate the presence of one or more errors. One or more error codes are appended to a particular sales tracings record based upon the type and quantity of errors detected in the sales tracings record at validation step 26. A list of error codes presently in use is set forth in Table 1 below:

TABLE 1

| Error Code | Priority | Description |
| --- | --- | --- |
| AA | high | contract number is missing |
| BB | high | contract number is incorrect |
| CC | high | contract is expired |
| DD | high | contract is not yet in force |
| EE | high | invoice date missing or invalid |
| FF | high | customer not covered |
| GG | high | customer expired |
| HH | high | customer not yet eligible |
| II | high | customer id number missing |
| JJ | high | customer id number invalid |
| KK | high | drug not covered |
| LL | high | drug expired |
| MM | high | drug not yet eligible |
| NN | high | drug number missing or invalid |
| OO | high | wholesaler not covered |
| PP | high | wholesaler expired |
| QQ | high | wholesaler not yet eligible |
| RR | high | quantity invalid or not supplied |
| SS | high | contract price missing or incorrect |
| TT | medium | contract price inserted or corrected |
| UU | high | unit cost missing or incorrect |
| VV | medium | unit cost inserted or corrected |
| WW | medium | extended amount incorrect |
| XX | medium | extended amount corrected |

TABLE 1-continued

| Error Code | Priority | Description |
| --- | --- | --- |
| YY | medium | duplicate chargeback request |
| A0 | high | invoice number missing |
| A1 | medium | insufficient wholesaler inventory |
| A2 | high | line item too old |
| A3 | high | quantity invalid - free goods |
| A5 | high | no wholesaler list price for item submitted |
| A7 | high | line item has been closed in this debit memo |
| A8 | medium | override wholesaler list price is less than manufacturers agreement price |
| A9 | medium | user adjustment for processed line item |
| B1 | high | multiple wholesaler prices for invoice date |
| B0 | medium | control total submitted does not match calculated |
| B2 | high | contract and price list unit of measures do not match |
| B4 | high | unit of measure mis-match for price list and agreement |
| B3 | high | unit of measure is invalid for price list pricing |
| B5 | high | unit of measure is invalid for agreement pricing |

This error code list may be modified or expanded with any known error condition based upon a particular contract agreement and the types of data that are anticipated in a sales tracings record.

If there are no errors or problems in the sales tracings records at step 28, then execution continues at step 30. At step 30, the sales tracings data is reconciled. Following step 30, at step 31, sales analysis data is generated, sales reports are compiled by system 16 and electronically provided to manufacturers 18 so that rebates may be paid to trading partners based on specific supplier contract provisions discussed above. The program returns after step 31 to steps 22 and 24.

If at step 28 any sales tracings records with errors are detected, then program execution continues at step 32. At step 32 a procedure for correcting errors in the sales tracings records is determined. Certain errors must be corrected before others, and the procedure for accomplishing such is determined at step 32. Further detail regarding the operations taking place at step 32 is provided in the flowchart of FIG. 3 and discussed in detail below. Following step 32, recommended error corrections or proposed solutions to errors in sales tracings records are visually presented to a contract administrator at step 34 via internet based interactive web browser technology or other suitable interactive programs for displaying data to a user and extracting input from that user to correct noted data errors. The user, or contract administrator an employee of the manufacturers 18, is notified of the need to correct errors either via email, instant messaging or by displaying error conditions upon the contract administrator logging on to system 16 and displaying web pages in a web browser program to view sales tracings data errors. Logging in to system 16 is accomplished using account name and password methodologies, well known in the computer art, to access system 16 and retrieve and display sales tracings errors identified by system 16 as well as reports and data summaries created by system 16.

Next, at step 34, a contract administrator, for a manufacturer 18, uses a computer to interact with system 18 to connect with or logon to system 16 and display and review sales tracings summary information, in particular, information on sales tracings records marked or flagged with errors that were detected during validation step 26. When a contract administrator for a manufacturer logs on to system 16, an organized display of information is provided regarding errors detected in sales tracings. If the contract administrator is already logged on to system 16, a notification is sent to the administrator's computer regarding errors in sales tracings records that will require correction. System 16 will also notify contract administrators via email that there exist sales tracings records with errors that require correction. Next, at step 36, a GUI display of one of multiple data repair windows is accessed by contract administrators. The data repair windows are organized by error type and include proposed error corrections or solutions to errors in the sales tracings records for that manufacturer's products. The errors and proposed solutions are displayed for review along with a manual override capability that enables the contract administrator to manually enter corrected data if the proposed error correction determined by system 16 is not appropriate. One suitable interactive GUI interface for displaying and exchanging data with manufacturers is provided using a web browser program (examples of such include Internet Explorer, Mozilla Firefox, Opera, Safari and others well known in the computing industry) that enables the contract administrator to access and logon to system 16, visually review and accept proposed solutions to sales tracings data errors and/or reject proposed solutions and enter specific data corrections to sales tracings records containing errors. Examples of such web browser user interfaces are shown in FIGS. 7-18. The various repair windows displayed are specifically designed for particular types of errors in the data thereby enhancing the contract administrator's ability to understand the error and the proposed solution determined by system 16. Once the contract administrator approves the proposed changes and/or enters manual data for correcting the errors detected in the sales tracings records for that manufacturer, the correction data or correction instructions are transmitted to system 16. System 16 receives corrected sales tracings data from contract administrators and updates sales tracings records in the database. Errors that are not repairable are flagged as such by the contract administrator and system 16 receives a notification from the contract administrator regarding these unrepairable sales tracings records. All corrections to sales tracings records are received by system 16, processed into the appropriate sales tracings records, and stored in a database. Unrepairable sales tracings records identified by the contract administrator are marked as such by system 16. Next, at step 37, Sales tracings records that are identified as unrepairable by the contract administrator are removed from the database and returned or transmitted to vendors 10 for correction and editing and subsequent resubmission to system 16. Program execution then returns to step 26 wherein the sales tracings record validation loop is again executed. The program loop comprised of steps 26, 28, 32, 34, 36 and 37 will execute repeatedly until all data errors are fully addressed in the sales tracings data received from vendors 10.

Figure 3:
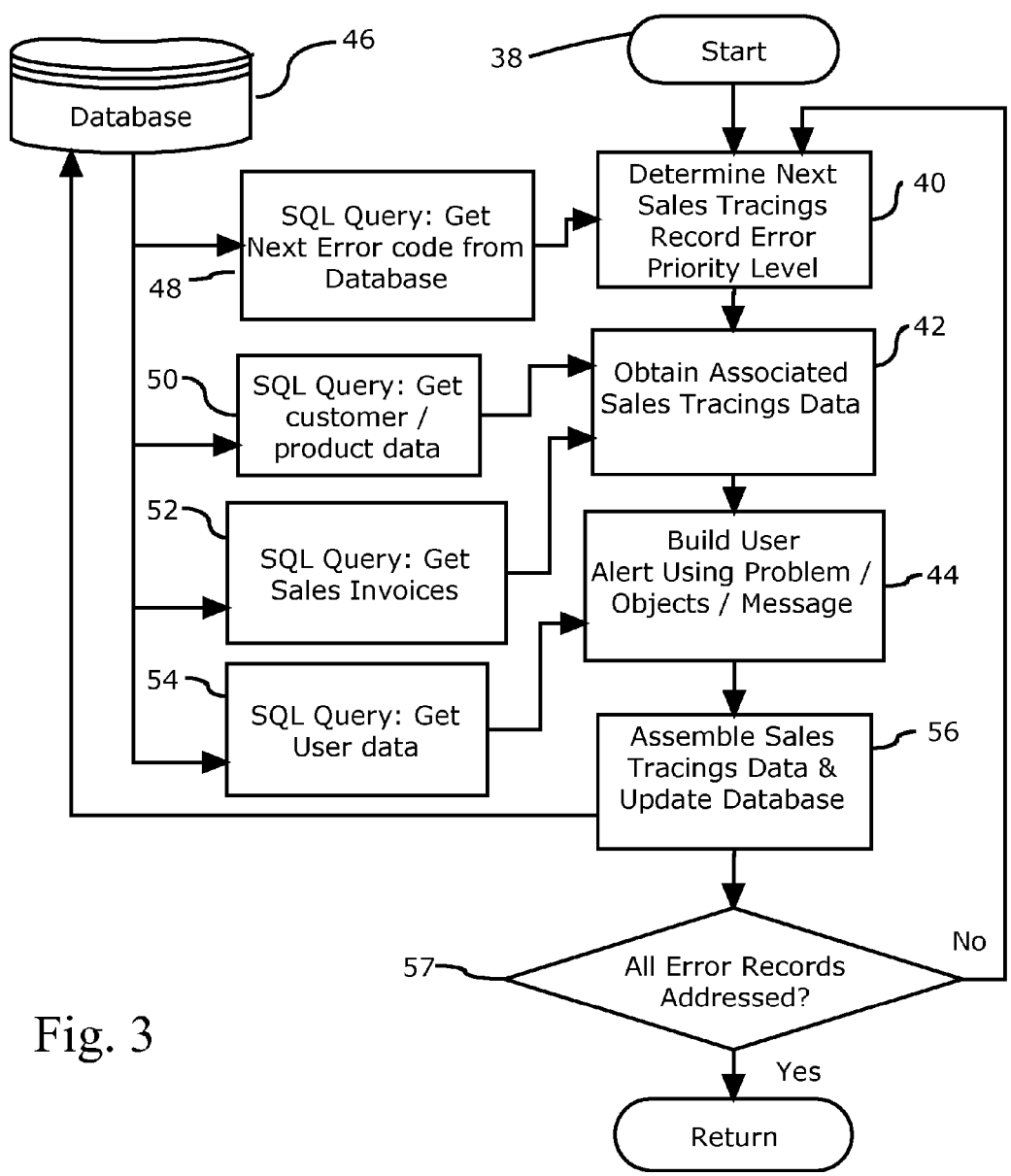
FIG. 3 is a detailed flowchart of the steps performed in block 32 of FIG. 2 labeled "Review data errors and build a procedure for correcting the errors".

Referring now to FIG. 3, a flowchart for reviewing sales tracings record data errors and building a procedure for correcting the errors is shown. The steps shown in FIG. 3 are a more detailed discussion of the operations taking place in step 32 of FIG. 2. Execution begins at step 38 followed by step 40 where error levels are examined for all sales tracings records for products from a particular manufacturer 18. At step 40, the sales tracings record database 46 is accessed via a SQL (structured query language) query at step 48 to obtain the next sales tracings record marked as containing data errors. User ID data is contained in each sales tracings data record to identify which vendor 10 submitted the data to system 16. The order in which errors will be repaired is based on the type of error identified (see list of errors set forth above in Table 1). Higher priority errors must be resolved before lower priority errors if more than one error exists in a particular sales tracings record. A "Contract ID Invalid" error is an error that must be resolved first as this data element is the most important data component in a sales tracings record. Once a "Contract ID Invalid" error has been corrected, the contract administrator can address the next most serious errors that may occur such as a "Customer Invalid" error, pricing error or the like. Finally, "Product Not Covered" errors and other errors are addressed. The objective is to present the data that requires correction to the contract administrator in an orderly fashion, thereby reducing the time and number of steps required to repair sales tracings records properly. Once all of the errors are processed, then an orderly procedure can be developed to present the data to the trading partner for purposes of repairing the sales tracings records marked as containing errors.

At step 40, for each sales tracings data record containing one or more errors the error level or error code is obtained for sales tracings from a particular manufacturer. Next, at step 42, a database SQL query is formulated based upon the error level identified in step 40 to obtain "associated" sales tracings records. Associated data is obtained from database 46 at steps 50 and 52. The error level or ID for the sales tracings record identified in step 40 is used to search in the database for "associated" data elements that will provide a suggested or proposed solution for any data identified as incorrect. This process includes obtaining "associated" invoice data elements such as submitted contract ID, vendor ID, customer ID, product ID and product pricing data from contract information stored in the database. System 16 also reviews contracts known to it in obtaining "associated" data. In the event the contract ID is invalid, then a search is undertaken to determine which contract terms stored in the database and known to system 16 covers the product that is the subject of the sales tracings data record. If "associated" data is found, then system 16 uses data such as contract ID, product ID, customer ID and corresponding pricing data from known contracts to determine a proposed solution to correct the identified error from step 40. The proposed solutions data will be displayed later to the contract administrator to enable quick acceptance thereof by the contract administrator during the process of reviewing and correcting sales tracings records with errors. The proposed solution data is attached to the error flagged sales tracings record as a proposed solution to the error marked in that particular sales tracings record.

Next, at step 44, system 16 builds a user alert message by examining the error code from step 40 to select context based messages that are presented to the contract administrator during the process of correcting errors in the sales tracings records. Context based messages that correspond with a particular error code are retrieved from memory or permanent storage locations. For example, the alert messages may state "There are Sales tracings Invoices errors that can be automatically repaired" coupled with any of the following: "There Are Open Debit Memos with Invalid Contract Ids" or "There Are Open Debit Memos with Customers That Are Not Covered On The Contract Submitted" or "There are Open Debit Memos where the Invoice Date is before or after the eligibility date of the Customer on the Contract" or "There are Open Debit Memos with Products that are not covered on the submitted Contract" or "There are Open Debit Memos with Wholesalers that are not covered on the submitted Contract" or "There are Open Debit Memos with Missing /Incorrect WAC Unit Prices" or "There are Open Debit Memos with Missing/Incorrect Contract Prices".

Next at step 56, if a viable proposed solution has been found for the error code retrieved in step 40, an alert message is selected that corresponds with the error code, and the sales tracings record is updated in the database with the proposed solution and corresponding alert message to be presented to the user. Alternatively, instead of including entire alert messages with each sales tracing record having an error, a pointer into an array of predetermined alert messages may be used to save space and speed execution. Thereafter, at step 57, if sales tracings records containing errors that have not yet been analyzed for a proposed solution are still present in the database, then program execution returns to step 40. If all sales tracings data records having errors have been analyzed or processed by system 16 to determine a proposed solution to the error, then program execution returns to the calling routine after step 57.

Figure 4:
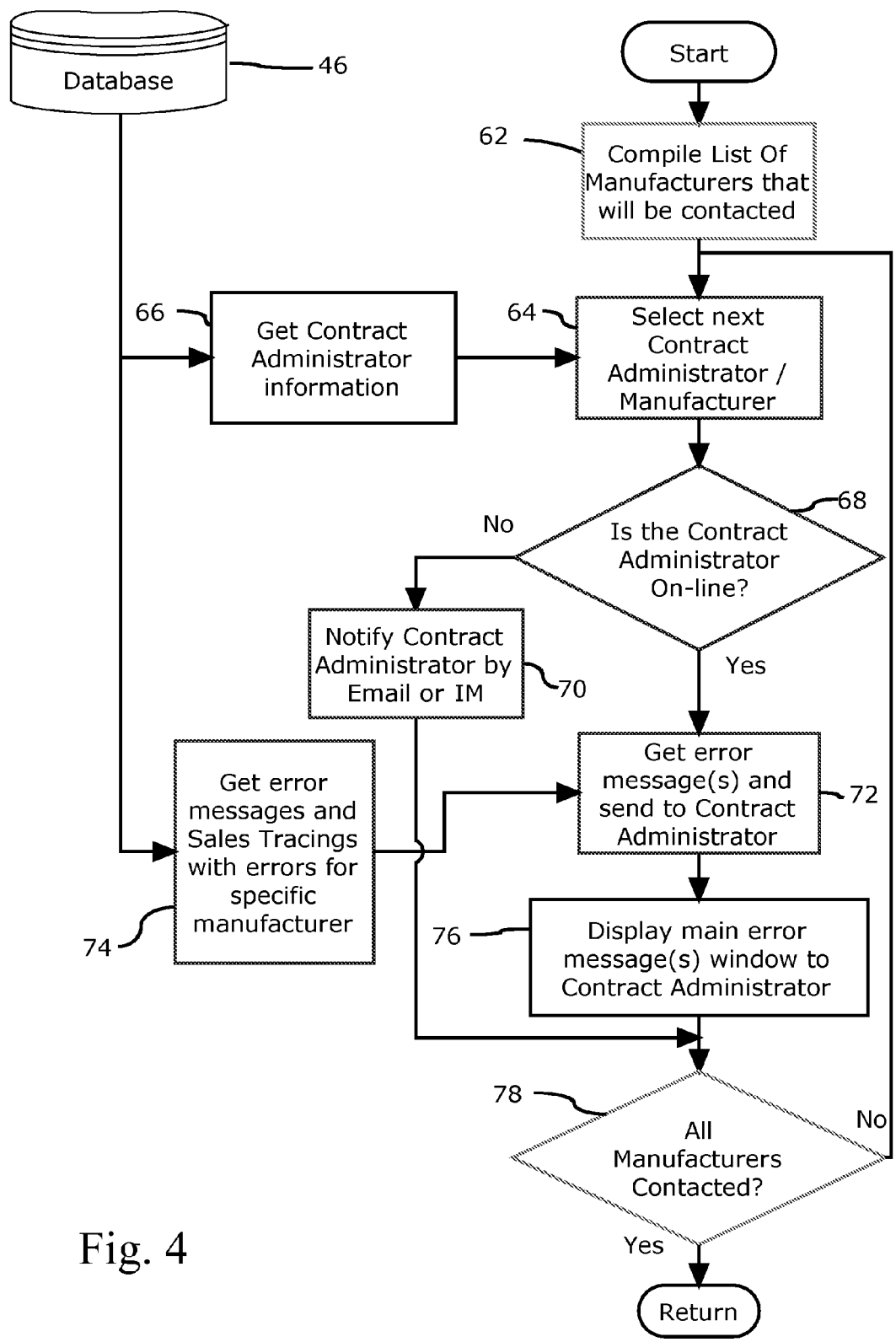
FIG. 4 is a detailed flowchart of the steps performed in block 34 of FIG. 2 labeled "Notify Contract Administrators of data errors and display summary information on errors".
Figure 7:
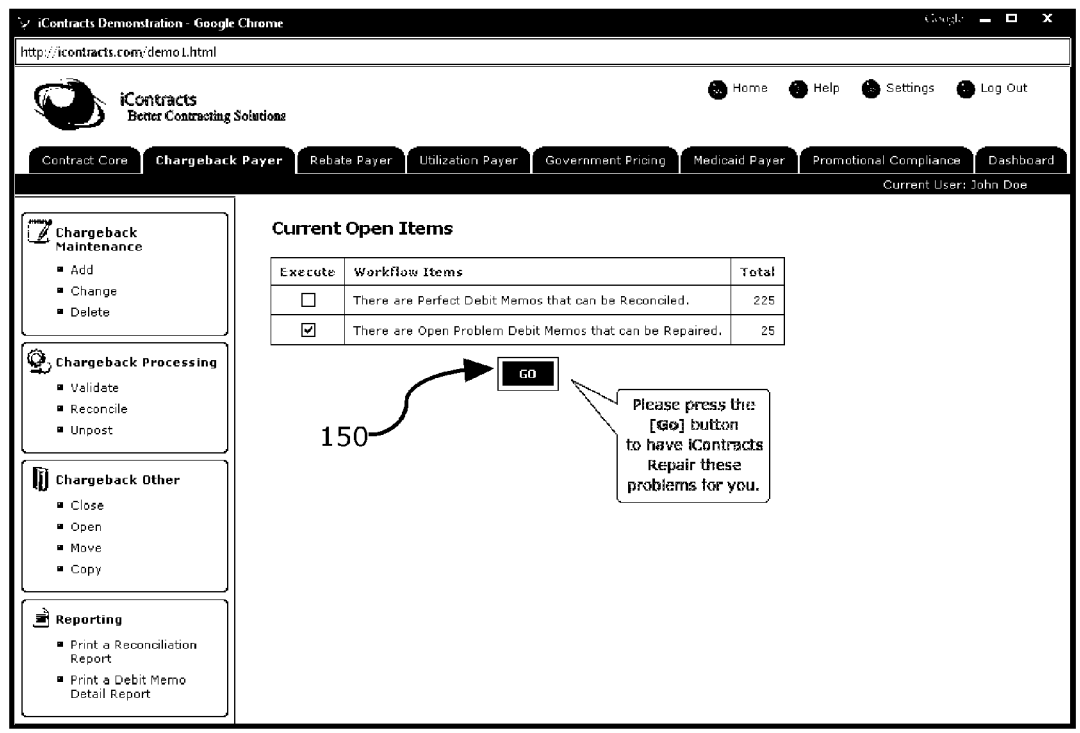
FIG. 7 is a screen capture of the browser window displayed to the contract administrator in step 76 of the flowchart of FIG. 4.

Referring now to FIG. 4, a flowchart for step 34, Notify Contract Administrators of data errors and display summary information on errors, of FIG. 2 is shown. At step 62, system 16 reviews all sales tracings records with errors to compile a list of the product IDs therein. The product ID is used to determine the manufacturer of the product. Using the product ID data a list of manufacturers is compiled that will need to be contacted regarding errors in sales tracings records. Next at step 64, the list of manufacturers compiled in step 62 is accessed starting at the top of the list. A corresponding contract administrator for the currently selected manufacturer is determined from data stored in database 46 in step 66. Then, at step 68, system 16 determines if the contract administrator for the selected manufacturer is "on-line" or logged in to system 16. If the user is not logged in, then execution continues at step 72 and system 16 sends an email alert or electronic instant message (IM) to the contract administrator notifying him of the need to access system 16 and correct errors in sales tracings records. Instant messages may be sent to IM programs, to cell phones as text messages, or to beeper devices well known in the IM art. If the contract administrator is logged in to system 16 at step 68, then execution continues at step 72 where the database is accessed though step 74 to obtain error messages and compute summary information concerning sales tracings records with and without errors for the products managed by the currently selected contract administrator. Next, at step 76, the summary data is presented to the contract administrator regarding the quantity of errors detected in the sales tracings records along with GUI objects that enable the administrator to access GUI repair windows and repair the sales tracings records with errors. Information displayed to the contract administrator at step 76 includes, but is not limited to, numerical summary data for quantity of perfect sales tracings records (those with no errors) and the quantity of sales tracings with errors where system 16 has determined a possible solution to the error. A hyperlink is provided in the displayed GUI window of step 76 so that the contract administrator may initiate the process for automatic and/or manual repair of sales tracings records with errors by mouse clicking the hyperlink. FIG. 7 is an example GUI screen provided to the contract administrator in step 76. Following step 76, at step 78, system 16 checks to see if all manufacturers in the list compiled at step 62 have been contacted. If not all manufacturers have been contacted, execution returns to step 64 wherein the next manufacturer is selected and its corresponding contract administrator employee is notified regarding sales tracings records that are perfect and those with errors. If all manufacturers have been contacted at step 78, then execution returns to the calling routine.

Figure 5:
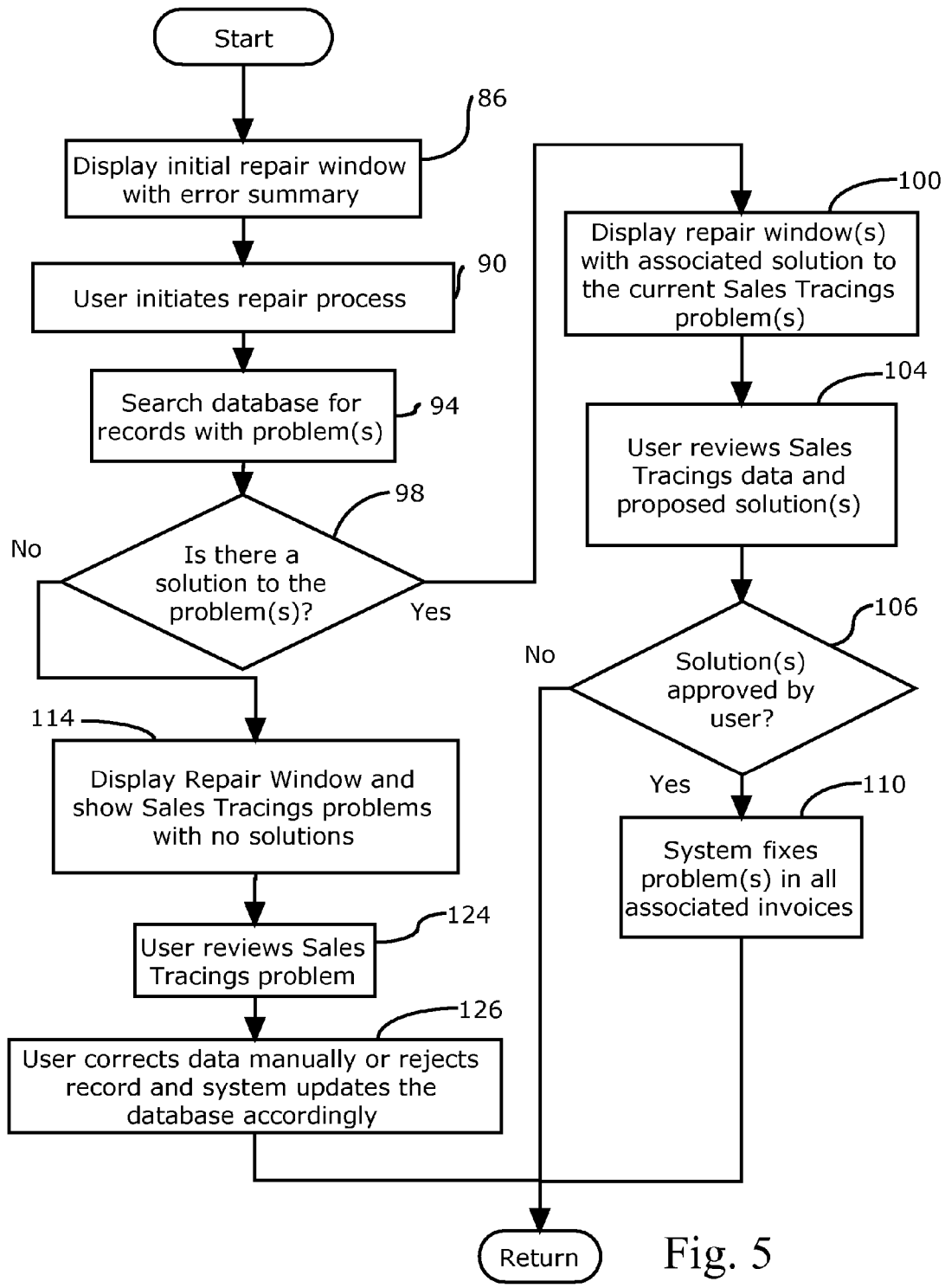
FIG. 5 is a detailed flowchart of the steps performed in block 36 of FIG. 2 labeled "Display Repair Window(s) with proposed error solutions and receive error correction data and repair corresponding Sales Tracings records".

Referring now to FIG. 5, a detailed flowchart for step 36 of FIG. 2 is shown. Beginning at step 86, system 16 has displayed on the contract administrator's computer a GUI window as shown in FIG. 7. When the contract administrator mouse clicks the Go button 150 at step 90, system 16 searches its database and finds sales tracings records with errors at step 94 corresponding to the manufacturer accessing the system. Next at step 98, system 16 determines whether any of the sales tracings records with errors have a proposed solution. If there are proposed solutions to the data errors, execution continues at step 100 where the associated solution to the errors is displayed to the contract administrator. Data errors must be corrected in a logical and orderly manner. First, invalid contract ID problems must be corrected. Once invalid contract Ids are corrected, then eligibility regarding customer, vendor and product must be corrected.

Lastly, product pricing errors are corrected. Following step 100, the contract administrator reviews the screens depicting sales tracings records with errors and proposed solutions to the errors at step 104. Data for each sales tracings record with errors is displayed in a tabular format with column headers providing a guide to the user regarding the data displayed (see FIGS. 8-17). Multiple repair windows are made available to the user in step 104 so that data is presented in an orderly fashion, e.g., data errors are grouped by type and then displayed to the user. Next at step 106, user feedback for proposed corrections is received by system 16 and for those records where the proposed solution or correction is accepted system 16 updates corresponding sales tracings records in its database with the accepted corrections in step 110. Where the proposed solution is not accepted, execution returns to the calling routine after step 106.

Where there is no proposed solution for erroneous data at step 98, system 16 will execute step 114 and display a GUI window identifying the sales tracings records with such errors. Next at step 124, the user reviews the errors with no proposed solution and manually enters a solution to the errors at step 126. System 16 may also propose a list of solutions that the user may select from or optionally reject. Manual data is collected by system 16 from contract administrators, or users, via typed entries in a textbox GUI object displayed to the user in a browser based GUI window, or the manual data may be automatically generated by system 16 in response to the contract administrator selecting one of a number of items from a listbox. Execution returns to the calling routine after step 126.

Figure 6:
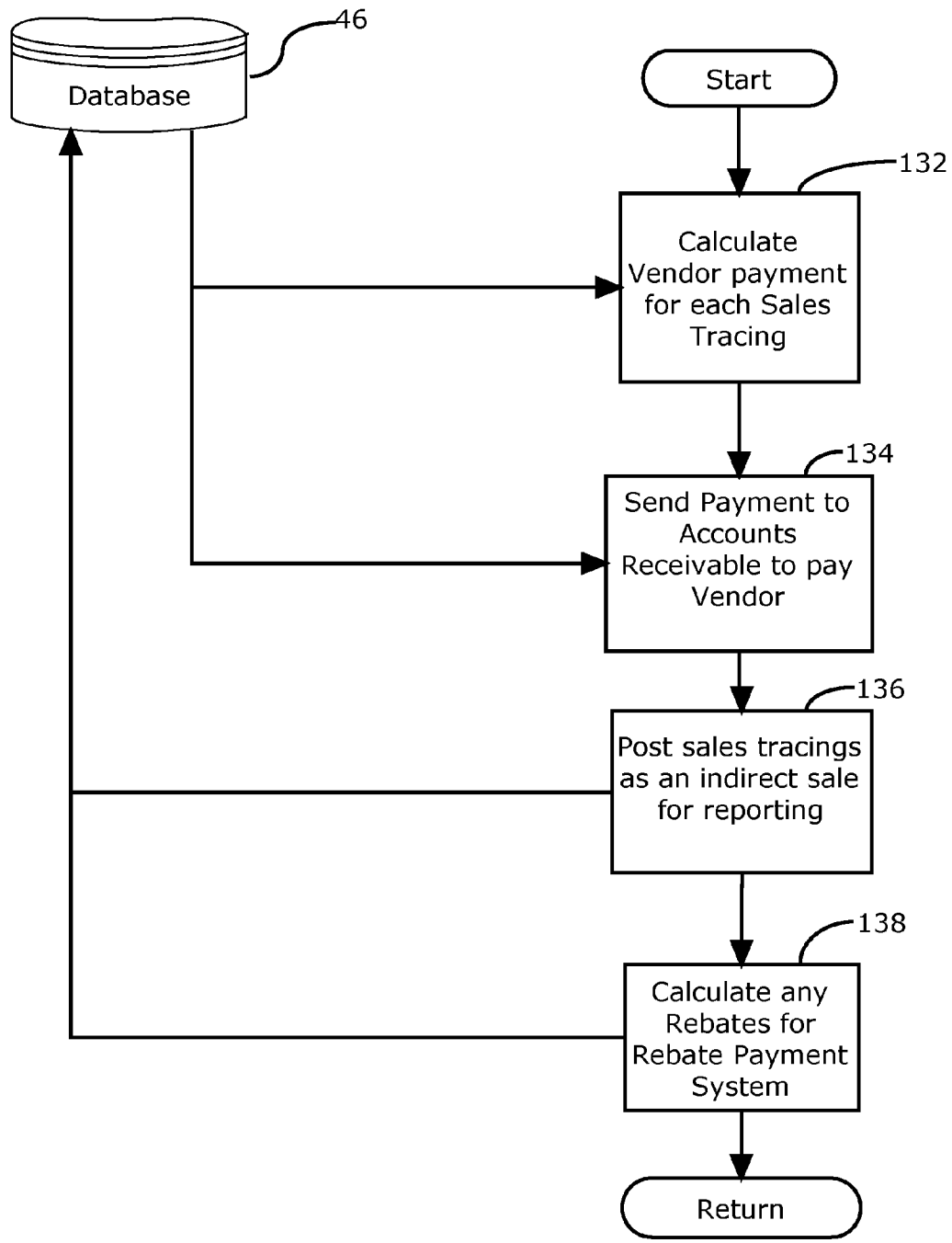
FIG. 6 is a detailed flowchart of the steps performed in block 30 of FIG. 2 labeled "Reconcile Sales Tracings".

Referring now to FIG. 6, a more detailed flowchart for step 30 Reconcile Sales Tracings of FIG. 2 is shown. The flowchart of FIG. 6 provides additional detail regarding the reconciliation processing of sales tracings records by system 16. At step 132 system 16 reviews sales tracings records in database 46 having a status of "open", indicating the record has not yet been processed for rebate payments to vendors, and calculates vendor rebate payments based on the difference between the WAC price and the contract price for the particular product described and the product quantity data in each sales tracings record. Sales tracings records must have no detected errors in the data in order for system 16 to reconcile the records and calculate rebate payments due vendors. Next at step 134, system 16 transmits data to the accounting department of manufacturers 18 where their products were the subject of reconciled sales tracings records and corresponding rebates calculated. The manufacturers then credit the account of the vendor 10 responsible for the sale in the amount of the rebate. Next at step 136 the processed sales tracings records are posted as an indirect sale for report generation purposes. Next at step 138, system 16 calculates rebates for processing by the rebate payment system where vendors are paid directly by check or electronic funds transfer. Following step 138, program execution returns to the calling routine. At steps 132, 134, 136 and 138 system 16 accesses database 46 to examine and modify sales tracings records to reflect the reconciliation process has taken place. When a sales tracings record has been reconciled, a status flag in the record is set to "closed" indicating the data has been processed or reconciled.

Figure 8:
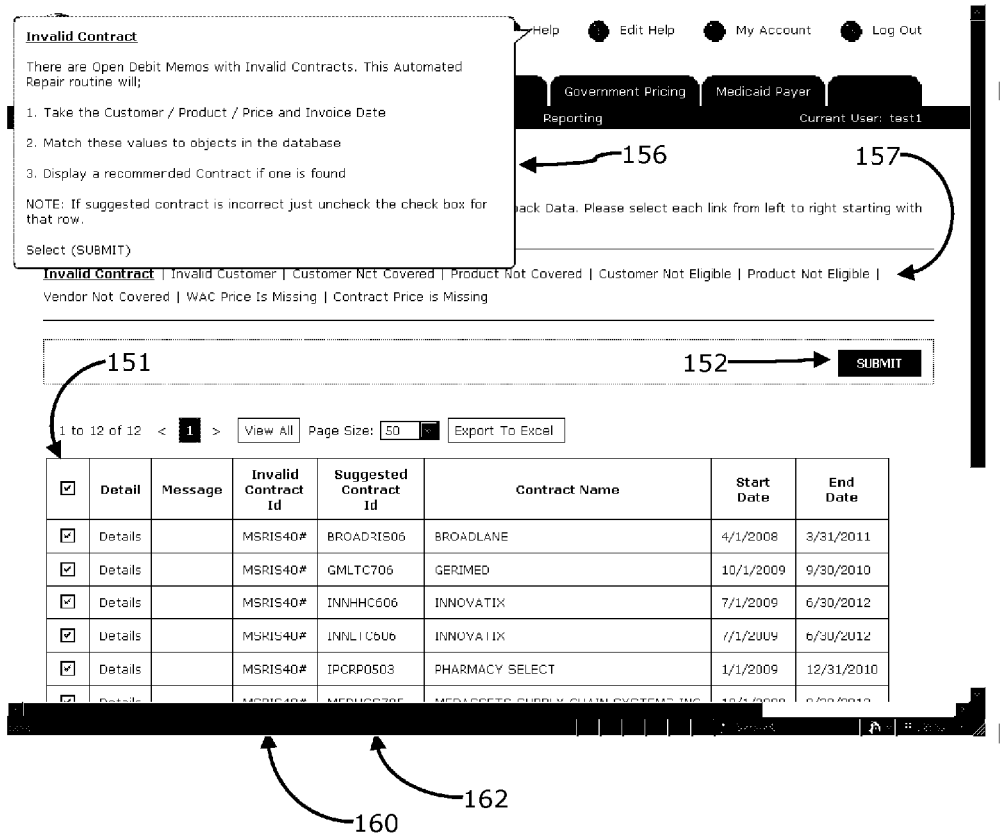
FIG. 8 is a screen capture of the browser window for repair of invalid contract ID data where system 16 displays a proposed solution to the error.
Figure 14:
FIG. 14 is a screen capture of the browser window for repair of vendor not covered errors.
Figure 16:
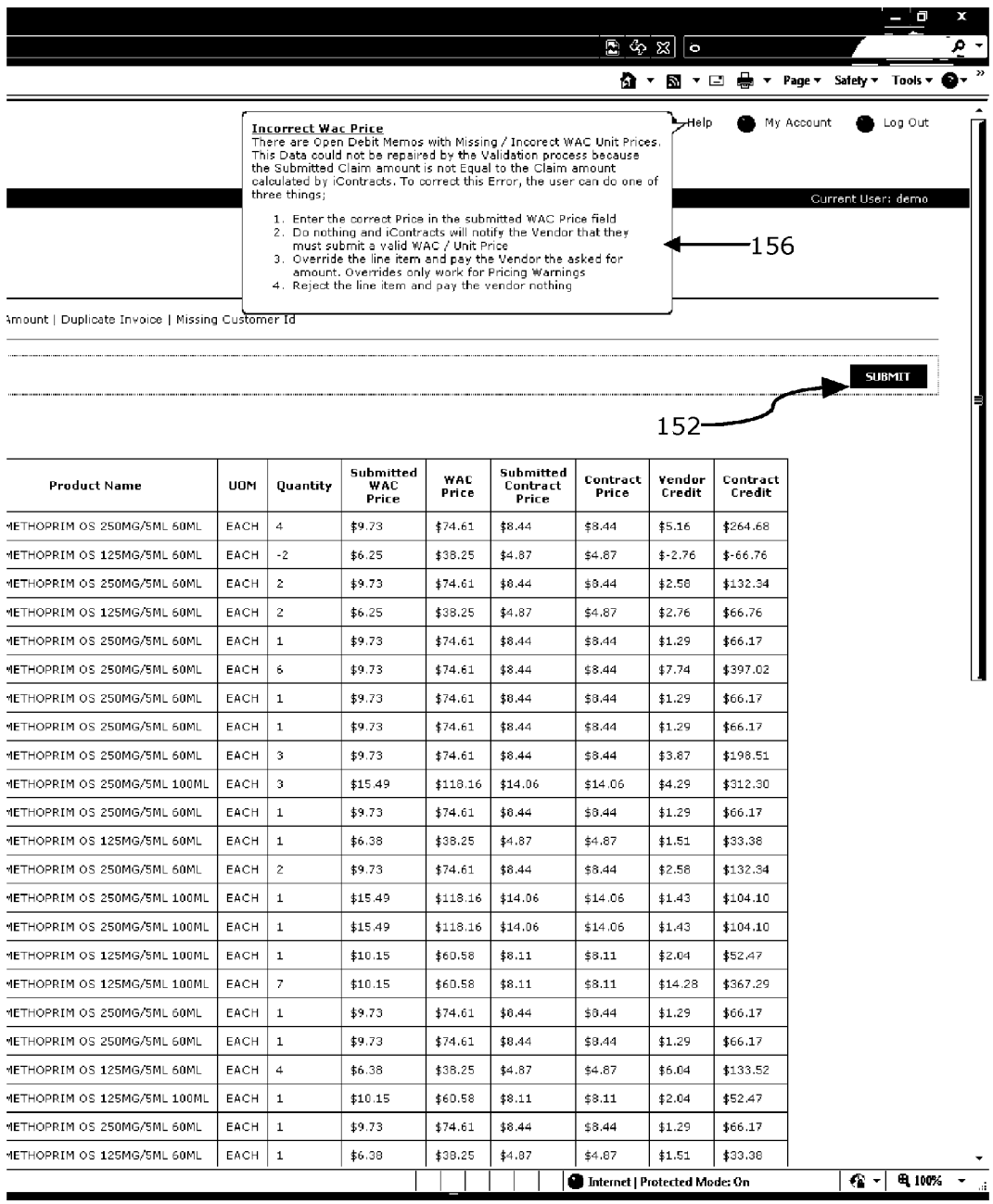
FIG. 16 is the right half of a screen capture of the browser window for repair of incorrect WAC price errors.
Figure 18:
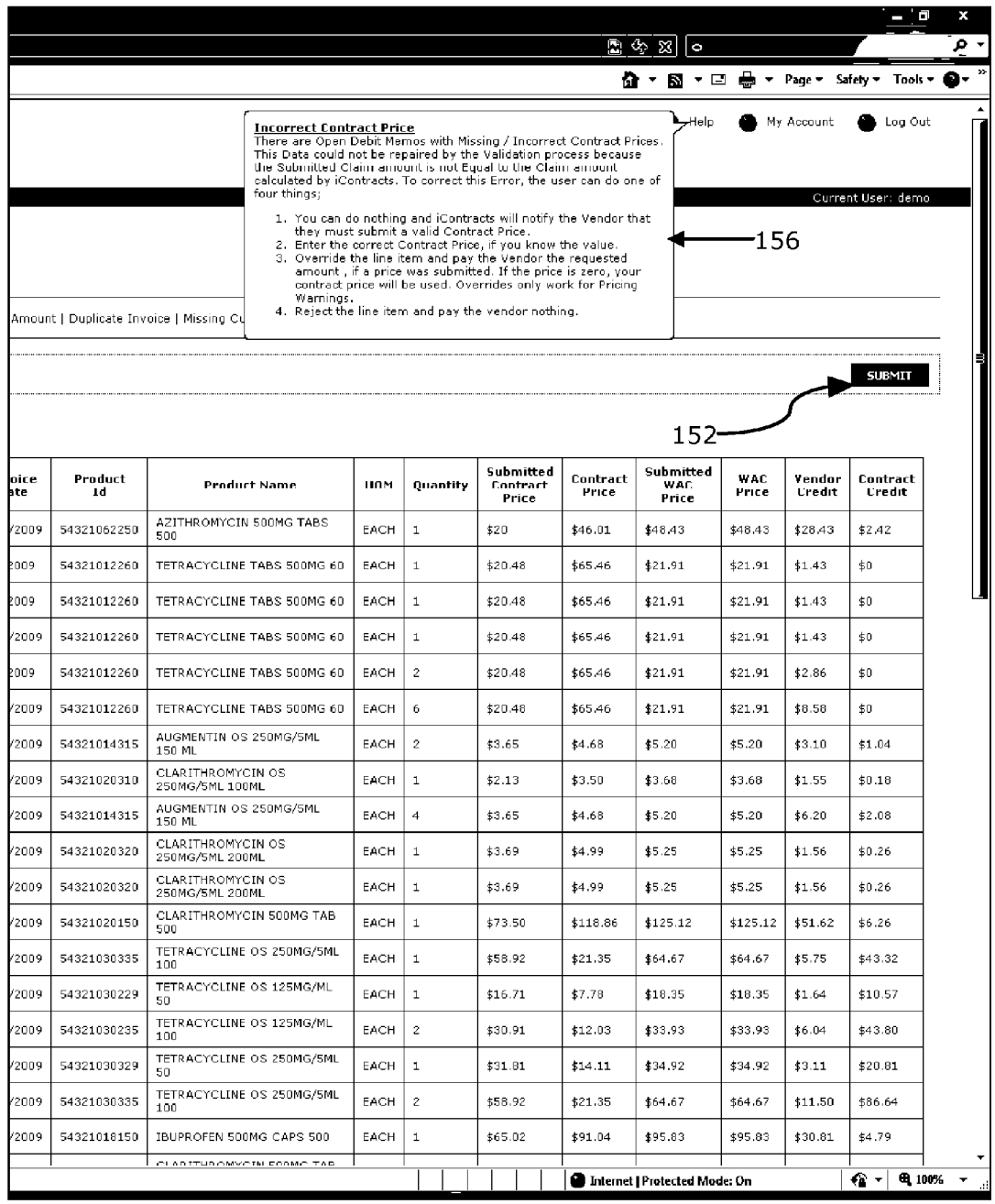
FIG. 18 is the right half of a screen capture of the browser window for repair of incorrect contract price errors.
Figure 18:
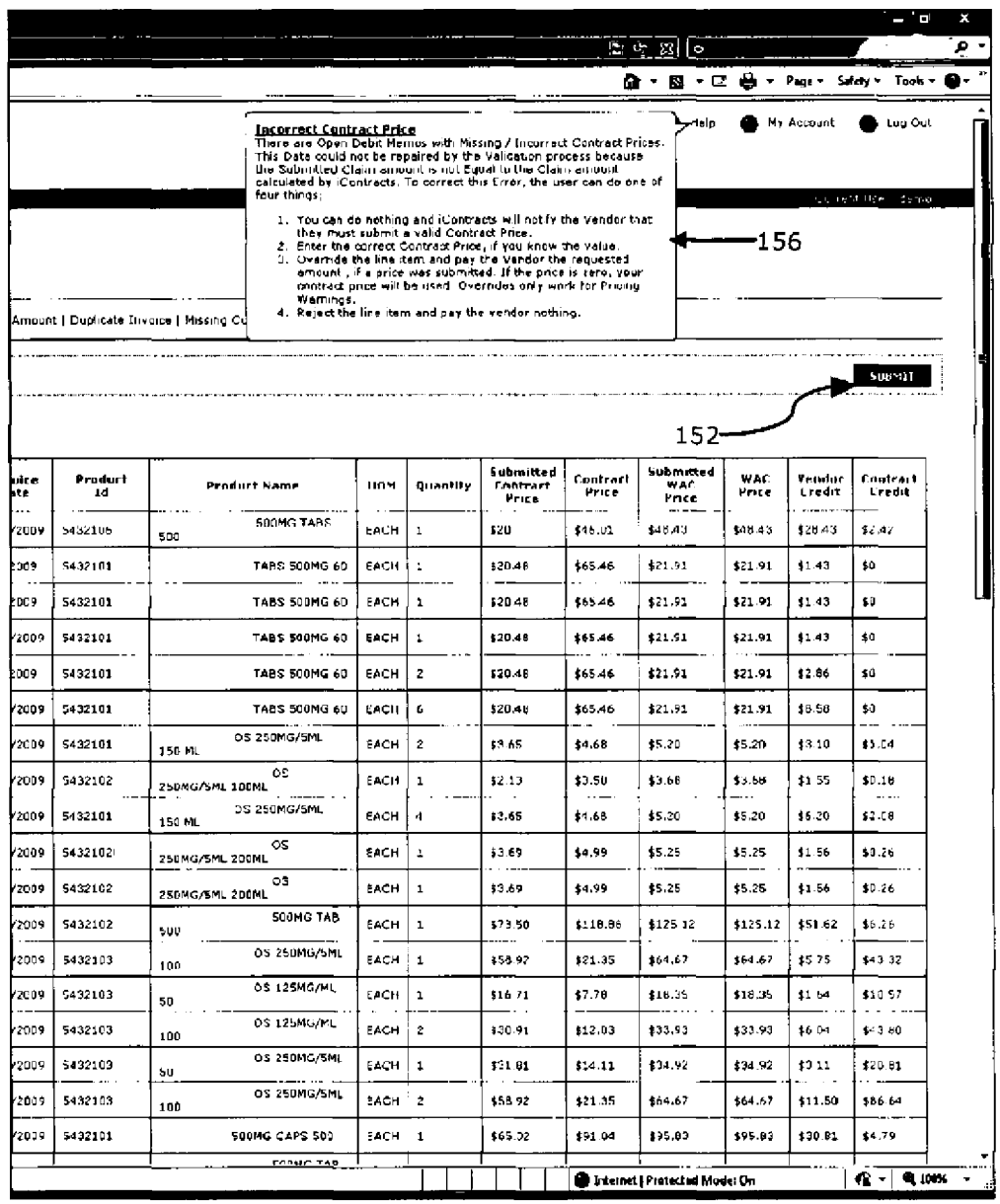

Referring now to FIGS. 8-18, GUI repair windows accessed by users (users or contract administrators employed by manufacturers) at step 100 in FIG. 5 are shown. Repair windows shown in FIGS. 8 and 14 are essentially one-click solutions to large quantity of errors in a plurality of sales tracings records if the user reviewing the data finds the proposed solutions, determined by system 16, to be acceptable. Due to the image resolution of information contained in the screen images, some of the images are split into two figures. Specifically, the images in FIGS. 15 and 16 are the left half and right half, respectively, of the browser repair window for correcting incorrect WAC price data. The images in FIGS. 17 and 18 are the left half and right half screen images, respectively, of the browser window used to review and correct incorrect contract price data.

The general layout of the GUI repair screens shown in FIGS. 8-18 includes a table with column headers providing the user with a guide to the information or data presented. Included in each repair window is an array of hyperlinks 157 that enable the user to click one of the links and navigate amongst a number of repair windows made available by system 16. A column of checkboxes 151 (GUI graphical objects well known in the art) is provided in each table so that the contract administrator may easily accept or reject the proposed correction in each sales tracings record line displayed. A "Submit" GUI button 152 is provided in each repair window for the contract administrator to mouse click thereby instructing system 16 to accept the proposed corrections for data and reject those items where the contract administrator has indicated such via the state of the checkboxes in each line of the tables. Override checkboxes 154 are provided in FIGS. 15 and 17 and enable the contract administrator to force system 16 to accept pricing data detected as erroneous and system 16 will generate rebate calculations based on the overridden pricing data.

Functionally speaking, the GUI repair windows of FIGS. 8-18 are initially presented to the user in a logical order. First, the user is shown the GUI browser interface of FIG. 8, after clicking the GO button 150 of FIG. 7, so that invalid contract information is addressed and corrected first. In addition to text displayed on the browser page of FIG. 8, popup help objects 156 (present in each repair window) provide the user with instructional information that enables increased understanding of the purpose of the information presented and the actions system 16 will take in response to user input. A group of hyperlinks 157 are provided in the browser image of FIG. 8 that enable the user to navigate their browser window to various other repair windows, and which include the following links: Invalid Contract, Customer Not Covered, Product Not Covered, Customer Not Eligible, Product Not Eligible, Vendor Not Covered, WAC Price Is Missing, and Contract Price Is Missing. Each of the clickable links in the hyperlink group 157 is enabled when errors pertaining to each category type (described by the hyperlink language) are present in the sales tracings records analyzed by system 16 for the current manufacturer logged on to system 16. If no errors are detected for a particular category type of data, system 16 will display the corresponding hyperlink "greyed out" or unavailable in the repair windows of FIGS. 8-18. In practice, colored hyperlinks such as orange or red are used to display enabled hyperlinks, and grey colored hyperlinks are used to indicate a hyperlink that is disabled, which is typical of modern GUI based web browser interfaces. When the user clicks submit button 152, corresponding data from the checkboxes is transmitted from the manufacturer's computer to system 16 and the invalid contract ID changes proposed in FIG. 8 are implemented in the records listed, and system 16 next displays the browser window shown in FIG. 9.

Figure 9:
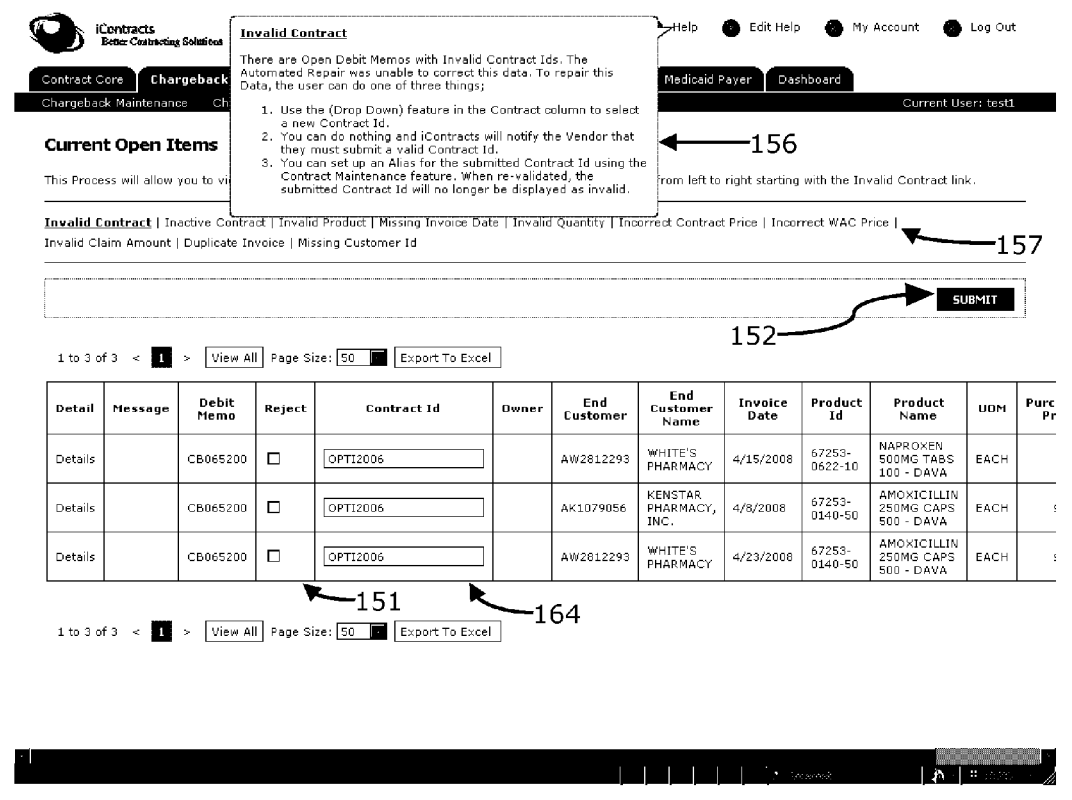

Referring now to FIG. 9, a browser repair window for invalid contract ID data where no solution is ascertainable by system 16 is shown. System 16 includes in this browser repair window considerable detail regarding sales tracings records where system 16 was unable to determine a proposed solution to an invalid contract ID error. Popup help object 156 provides the user with instructions on the error detected and actions to be taken by the user. A drop-down listbox (a well known GUI object) is provided in column 164 that is populated with a plurality of valid contracts known to system 16 that may be appropriate selections to correct the error noted. The user may click and select one of the items in the drop down listbox column 164 as a solution to the error or the user may click the checkboxes of column 151 to indicate the sales tracings record should be rejected and returned to the vendor for correction, in which case system 16 notifies the vendor via electronic means of the rejected data record. Vendors must then modify the data and electronically resubmit the rejected sales tracings record data to system 16 as a new invoice to effect processing of that data and receive any corresponding rebate payment. Help popup 156 provides detailed instructions to the user regarding the function of this browser window and actions to be taken by the user. It should be noted that the user is given an option to set up an alias for the submitted contract ID. This feature is not detailed in FIG. 9 as it is accessed via another browser screen, and is noted as a useful mechanism for substituting an alias name for a particular contract ID. Upon reviewing, accepting, altering or rejecting displayed contract ID data using the browser interface objects shown in FIG. 9, the user clicks the Submit button 152 and the records are processed by system 16 in accordance with the user's selections in columns 151 and 164. After clicking the Submit button 152 in FIG. 9, the user is provided with visual feedback in the browser window regarding the actions taken by system 16.

Next, the user will click another of the enabled repair window hyperlinks 157 to navigate to another repair window to review and provide input regarding data errors presented therein.

The various contracts established by the manufacturers, and known to system 16, enumerate which vendors, customers and products are eligible or covered under the terms of the contract for specified product pricing as well as the start and end dates or term of the contract. Contract eligibility repair windows include those GUI interfaces shown in FIGS. 10-14.

Figure 10:
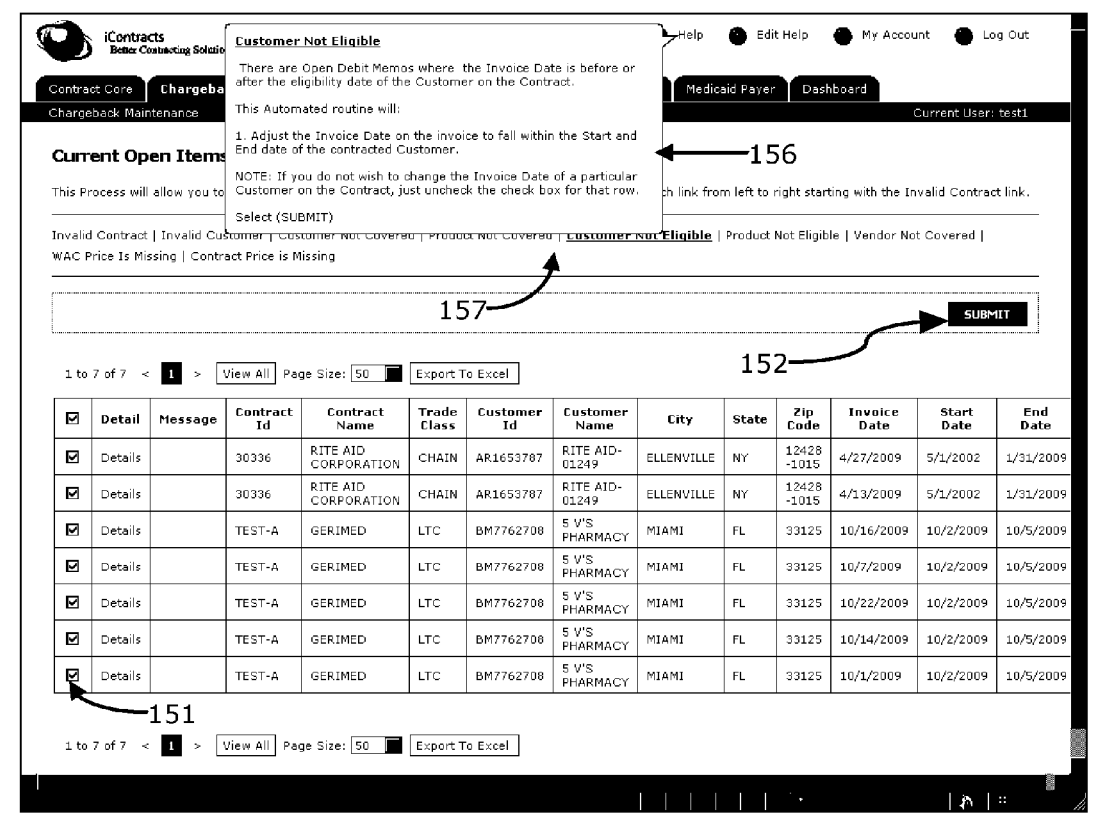

Referring now to FIG. 10, a GUI browser screen is shown that is used for correction of "customer not eligible" errors. FIG. 10 depicts the data presented to the user by system 16 for repairing "customer not eligible" errors. Popup help object 156 provides the user with instructions on the error detected and actions to be taken by the user. Eligibility is based on contract term and system 16 offers the user an option to permit system 16 to adjust the invoice date to fall within the start and end date of the contracted customer. The user is saved the effort of entering a date as system 16 automatically adjusts the date to fall within the date window of the contract. The default state of the checkboxes is "checked" and the user unchecks each checkbox in column 151 where the user does not desire the date to be modified for a particular row of data. Once the user has unchecked the boxes where adjustment of the date is not desired, the user clicks the Submit button 152 and system 16 adjusts records where instructed to and rejects data records where the adjustment has been disallowed by the user. Feedback is then given to the user regarding the updating process and records that are not repairable are returned to the vendor as rejected invoice data requiring resubmission by the vendor. Hyperlinks 157 provide the user with a browser navigation tool to display other related repair windows.

Figure 11:
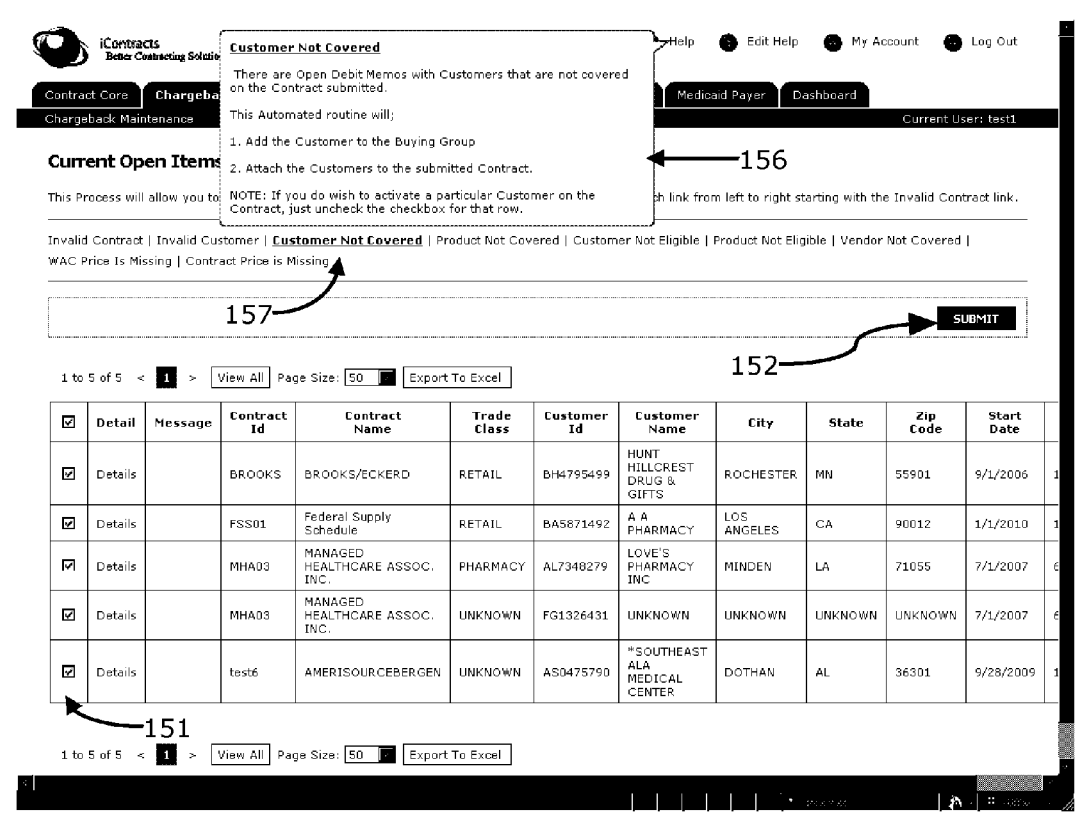

Referring now to FIG. 11, the "Customer Not Covered" repair window is shown. System 16 has detected that the customers listed in the table are not covered by the contract indicated in table column and the user is given an option to add the customer to the buying group for the contract. Popup help object 156 provides the user with instructions on the error detected and actions to be taken by the user. The user mouse-clicks to uncheck individual checkboxes in column 151 to prevent system 16 from adding the customer in a particular row of the table to the buying group. Submit button 152 is clicked to instruct system 16 that the user has completed the review and the state of the checkboxes in column 151 is transmitted to system 16 for updating of corresponding sales tracings records. The sales tracings records displayed in those rows where the user unchecked the checkbox are rejected and returned to the vendor for correction and resubmission to system 16. Hyperlinks 157 provide the user with a browser navigation tool for display of other data repair windows.

Referring now to FIG. 12, the "Product Not Eligible" GUI repair window is shown. This window is used to repair sales tracings records and correct the invoice date to fall within the start and end date for the product specified. Popup help object 156 provides the user with instructions on the error detected and actions to be taken by the user. The user unchecks the checkboxes in column 151 to prevent system 16 from making the suggested modification to the sales tracings record shown in a particular row of the table of data. Clicking the submit button 152 causes the state of the checkboxes in column 151 to be transmitted to system 16 so that the user selected changes to the sales tracings records is implemented. The sales tracings records displayed in those rows where the user unchecked the checkbox are rejected and returned to the vendor for correction and resubmission to system 16. Where a checkbox is still checked in a particular row, system 16 implements the suggested changes in the data and modifies the invoice date to fall within the start and end dates for the product specified. Hyperlinks 157 provide the user with a browser navigation tool for display of other data repair windows.

Referring now to FIG. 13, the "Product Not Covered" GUI repair window is shown. This window is used to repair sales tracings records and add a product to the contract indicated in the Contract ID column. The user unchecks the checkboxes in column 151 to prevent system 16 from making the suggested modification to the contract in each row. Popup help object 156 provides the user with instructions on the error detected and actions to be taken by the user. Clicking the submit button 152 causes the state of the checkboxes in column 151 to be transmitted to system 16 so that the user selected changes to the sales tracings records is implemented. The sales tracings records displayed in those rows where the user unchecked the checkbox are rejected and returned to the vendor for correction and resubmission to system 16. Where a checkbox remains checked in a particular row, system 16 adds the product to the contract for each row of sales tracings records shown upon activation of submit button 152. Hyperlinks 157 provide the user with a browser navigation tool for navigation to other sales tracings data repair windows.

Referring now to FIG. 14, the "Vendor Not Covered" GUI repair window is shown. The vendors not covered under the contract name listed in the table are proposed to be "attached" to the contract, or added as an accepted vendor under the corresponding contract in the Contract ID and Contract Name columns. Popup help object 156 provides the user with detailed instructions on the error detected and actions to be taken by the user. The default state of the checkboxes in column 151 is checked and the user must uncheck the box in a row to add the vendor to a contract. The state of the checkboxes in column 151 is transmitted to system 16 when the user clicks submit button 152, and system 16 updates the corresponding contracts accordingly. Hyperlinks 157 provide the user with a browser navigation tool for navigation to other repair data windows.

Sales tracings records having issues regarding incorrect product pricing are resolved via the GUI browser interfaces shown in FIGS. 15-18.

Referring now to FIGS. 15 and 16, the GUI interface for repairing "Incorrect WAC Price" is shown. FIG. 15 is the left half of the browser window image and FIG. 16 is the right half of the browser image displayed to the user by system 16. Popup help object 156 provides the user with instructions on the error detected and actions to be taken by the user. The user is provided with two GUI checkbox options in this repair window in columns 151 and 154 (shown in FIG. 15) for each row of data corresponding to a sales tracings record. Column 154 checkboxes enable the user to override WAC pricing and accept the price shown and column 151 checkboxes allow the user to reject a particular row of data and the pricing shown, thereby rejecting the sales tracings record for that row. System 16 receives the state of the checkboxes in columns 151 and 154 when the user clicks the submit button 152 (FIG. 16) and updates or rejects the corresponding sales tracings records in accordance with the corresponding checkbox states of each row in the table. Hyperlinks 157 provide the user with a browser navigation tool for navigation to other data repair windows.

Referring now to FIGS. 17 and 18, the GUI interface for repairing "Incorrect Contract Price" is shown. FIG. 17 is the left half of the browser window image and FIG. 18 is the right half of the browser image displayed to the user by system 16. Popup help object 156 provides the user with instructions on the error detected and actions to be taken by the user. The user is provided with two checkbox options in this repair window in columns 151 and 154 (shown in FIG. 15) for each row of data corresponding to a sales tracings record. Column 154 checkboxes enable the user to override contract pricing and accept the price shown and column 151 checkboxes allow the user to reject the row of data. System 16 receives the state of the checkboxes in columns 151 and 154 when the user clicks the submit button 152 (FIG. 18) and updates or rejects the corresponding sales tracings records in accordance with the corresponding checkbox states in each row in the table. Hyperlinks 157 provide the user with a browser navigation tool for navigation to other data repair windows.

While the invention has been illustrated and described in detail in the drawings and foregoing description of the preferred embodiment, the same is to be considered as illustrative and not restrictive in character, it being understood that only the preferred embodiment has been shown and described and that all changes and modifications that come within the spirit of the invention are desired to be protected.

What is claimed is:

1. A method for processing and correcting errors in electronically transmitted purchasing invoice data comprising the steps of:

providing a data information server system, said server system being computer based and having a processor, dynamic memory, a mass storage device for storing data and a networking device;

connecting said networking device to a wide area network to enable electronic communications with purchasers having purchaser computers connected to the wide area network and manufacturers having manufacturer computers connected to the wide area network;

receiving electronic invoices from purchaser computers over the wide area network, said electronic invoices containing sales tracings records, and storing said sales tracings records in said mass storage device, said sales tracings records including a vendor identifier, a purchaser identifier, a manufacturer identifier, a product description, a product price and a product quantity for a wide variety of products produced by various manufacturers;

analyzing said sales tracings records for errors and assigning error codes to each of said sales tracings records having errors in the data contained in the sales tracings record and storing said error code with said sales tracings record in said mass storage device;

creating a first electronic error report for a particular manufacturer in response to an electronic request from the particular manufacturer, said first electronic error report including a list of all sales tracings records having errors therein and a manufacturer ID corresponding to the particular manufacturer, and grouping together sales tracings records having identical errors codes and determining a proposed solution for each error code;

transmitting a first interactive GUI display screen to the particular manufacturer computer to display said first electronic error report corresponding to the manufacturers identifier, said first interactive GUI display screen including a plurality of first GUI input objects, one corresponding to each sales tracing record included in said first electronic error report, said plurality of first GUI input objects each being initially deactivated and user changeable to an activated state to indicate rejection of the proposed solution to correct the error code in each of the sales tracings records displayed; and receiving from the particular manufacturer's computer a first error correction command containing the state of each of said plurality of first GUI input objects, said first error correction command causing said server system to modify corresponding ones of said sales tracings records in accordance with the corresponding deactivated state of said plurality of first GUI input objects and the proposed solution for the corresponding sales tracings record.

2. The method of claim 1 including the steps of:

creating a second electronic error report for a particular manufacturer in response to an electronic request from the particular manufacturer, said second electronic error report including a list of all sales tracings records having a manufacturer ID corresponding to the particular manufacturer and having errors therein where multiple potential solutions exist, and grouping together those sales tracings records in accordance with errors codes contained therein;

transmitting a second interactive GUI display screen to the particular manufacturer computer to display said second electronic error report, said second GUI screen including a plurality of second GUI input objects, one situated adjacent each sales tracings record having an error with multiple potential solutions, and wherein each of said plurality of second GUI input objects is programmed with a list of solutions corresponding to the multiple potential solutions for the corresponding one of said sales tracings objects, said list of solutions being user selectable to select one of the multiple potential solutions in the list; and receiving from the particular manufacturer's computer a second error correction command in response to activation of said second plurality of GUI input objects, said second error correction command causing said server system to implement the user selected items in said plurality of second GUI input objects and correcting an error code in the corresponding ones of said sales tracings records.

3. The method of claim 2 including the steps of:

creating a third electronic error report for a particular manufacturer in response to an electronic request from the particular manufacturer, said third electronic error report including a list of all sales tracings records having a manufacturer ID corresponding to the particular manufacturer and having errors therein where no solution exists, and grouping together those sales tracings records in accordance with errors codes contained therein;

transmitting a third interactive GUI display screen to the particular manufacturer computer to display said third electronic error report, said third GUI screen including a plurality of third GUI input objects, one for each sales tracings record having an error with no known solution, and wherein each of said plurality of third GUI input objects accepts user entered data; and receiving from the particular manufacturer's computer a third error correction command containing the data entered into said plurality of third GUI input objects, said third error correction command causing said server system to implement the user entered data in said second GUI input object and correcting an error code in the corresponding one of said sales tracings records with said user entered data.

4. A method for processing and correcting errors in electronically transmitted purchasing invoice data comprising the steps of:

providing a data information server system, said server system being computer based and having a processor, dynamic memory, a mass storage device for storing data and a networking device;

connecting said networking device to a wide area network to enable electronic communications with purchasers having purchaser computers connected to the wide area network and manufacturers having manufacturer computers connected to the wide area network;

receiving electronic invoices from vendor computers over the wide area network, said electronic invoices comprised of sales tracings records, and storing said sales tracings records in said mass storage device, said sales tracings records including a manufacturer identifier, a purchaser identifier, a product identifier, a product price and a product quantity for a wide variety of products produced by various manufacturers;

analyzing each of said sales tracings records in said mass storage device for errors and attaching an error code indicative of the error detected to each of said sales tracings records containing an error and storing said error code along with said sales tracings record in said mass storage device;

performing the following steps for each unique manufacturer identifier found in said sales tracings records:

a) creating an error collection consisting of all sales tracings records having said unique manufacturer identifier stored therein and having an error code attached thereto;

b) formulating a proposed solution for each particular error code in said error collection;

d) transmitting an interactive GUI data screen to said manufacturer computer corresponding to said unique manufacturer identifier, said GUI screen including a first GUI input object for accepting the proposed solution to correct all instances of the particular error code in said sales tracings records in said error collection, said GUI data screen also including a second GUI input object for enabling user input of a user defined solution for each unique error code in said sales tracings records in said error collection;

e) receiving a first error correction command from a manufacturer computer in response to activation of said first GUI input object and implementing said proposed solution to correct all instances of the particular error code in said sales tracings records in said error collection; and f) receiving a second error correction command in response to activation of said second GUI input object and implementing said user defined solution to correct all instances of the particular error code in a plurality of sales tracings records in said error collection.

* * * * *

UNITED STATES PATENT AND TRADEMARK OFFICE
CERTIFICATE OF CORRECTION

| | | |
|---|---|---|
| PATENT NO. | : 8,195,537 B2 | Page 1 of 8 |
| APPLICATION NO. | : 13/068437 | |
| DATED | : June 5, 2012 | |
| INVENTOR(S) | : Bey et al. | |

It is certified that error appears in the above-identified patent and that said Letters Patent is hereby corrected as shown below:

Delete Figs. 9, 12, 13, 15, 16, 17 and 18 and replace with Figs. 9, 12, 13, 15, 16, 17 and 18 as shown on the attached pages.

Signed and Sealed this
Thirty-first Day of July, 2012

David J. Kappos
*Director of the United States Patent and Trademark Office*